United States Patent
Romero et al.

(10) Patent No.: US 10,331,665 B2
(45) Date of Patent: Jun. 25, 2019

(54) SEARCH QUERY PROCESSING

(71) Applicant: Amadeus S.A.S., Biot (FR)

(72) Inventors: Monica Maria Lozano Romero, Antibes (FR); Luca Rizzo, Antibes (FR); Christelle Arlaud, Biot (FR); Yoann Gueguen, Vallauris (FR); Olivier Tacaille, Valbonne (FR); Isabelle Capella, Vence (FR); Clémence Corinne Muriana, Antibes (FR)

(73) Assignee: AMADEUS S.A.S., Biot (FR)

( * ) Notice: Subject to any disclaimer, the term of this patent is extended or adjusted under 35 U.S.C. 154(b) by 228 days.

(21) Appl. No.: 15/281,372

(22) Filed: Sep. 30, 2016

(65) Prior Publication Data

US 2018/0096027 A1 Apr. 5, 2018

(51) Int. Cl.
*G06F 16/00* (2019.01)
*G06F 16/2453* (2019.01)
*G06F 16/2455* (2019.01)
*G06F 16/9535* (2019.01)

(52) U.S. Cl.
CPC ...... *G06F 16/2453* (2019.01); *G06F 16/2455* (2019.01); *G06F 16/9535* (2019.01)

(58) Field of Classification Search
None
See application file for complete search history.

(56) References Cited

U.S. PATENT DOCUMENTS

| 2002/0169743 | A1* | 11/2002 | Arnold | G06F 17/30861 |
| 2008/0294596 | A1* | 11/2008 | Xiong | G06F 17/30427 |
| 2011/0029472 | A1* | 2/2011 | Lai | G06N 5/025 706/47 |
| 2016/0300271 | A1* | 10/2016 | Scroggins, III | G06Q 30/0277 |
| 2017/0289287 | A1* | 10/2017 | Modi | H04L 67/26 |

OTHER PUBLICATIONS

Option Way website https://www.optionway.com/ Copyright © 2016 Option Way [retrieved from the internet on Dec. 19, 2016].
Algofly: Cheap flights and airline tickets, Copyright © 2016 algofly [retrieved from the internet on Dec. 19, 2016 at https://www.algofly.fr].
Algofly: Site Description, Copyright © 2016 algofly [retrieved from the internet on Dec. 19, 2016 at https://www.algofly.fr/c-est-quoi-algofly.php].

(Continued)

*Primary Examiner* — Son T Hoang
(74) *Attorney, Agent, or Firm* — Thompson Hine LLP

(57) ABSTRACT

Methods, systems, and computer program products for processing a search query store the search query in one or more persistent storage devices in response to the search query being received. Periodically and automatically thereafter, the search query is retrieved from the one or more persistent storage devices, and source data that relates to the search query is retrieved, using an iterative optimization algorithm, from one or more backend data sources. Responses for the search query are generated based on the source data, and a determination is made of whether each of the responses is notification eligible. A user is notified of each response determined notification eligible.

19 Claims, 9 Drawing Sheets

(56) References Cited

OTHER PUBLICATIONS

Umar, "FareCompare: Get Real Time Airfare Price Drop Alerts", Aug. 31, 2010 [retrieved from the internet http://www.makeuseof.com/tag/farecompare-airfare-price-drop/.

Grimmer, How to Set a Kayak Price Alert, an Easy Way to Save Hundreds, Dec. 16, 2012 [retrieved from the internet http://www.milevalue.com/how-to-set-a-kayak-price-alert-an-easy-way-to-save-hundreds/.

Packwood, "Get the Best Flight Tickets with Skyscanner Price Alerts", Feb. 23, 2016 [retrieved from the internet https://www.skyscanner.net/news/get-best-air-fares-skyscanner-price-alerts.

Frederico, "How-To Sign Up for FareCompare Free Email Airfare Alerts", Apr. 29, 2010 [retrieved from the internet http://www.farecompare.com/travel-advice/how-to-sign-up-for-farecompare-free-email-airfare-alerts/#/.

\* cited by examiner

SEARCH QUERY PROCESSING

TECHNICAL FIELD

The present invention generally relates to processing search queries and, more particularly, to systems, methods, and computer program products for generating notifications for previously submitted and stored search queries.

BACKGROUND

The Internet has enabled a level of information access that was previously unobtainable. For example, in post-Internet society, when a user desires information relating to a particular subject, such as available flights between an origin and a destination on specific dates, he or she may simply submit a search query that describes the subject to an Internet search engine. In response to receiving the search query, the search engine may scour various data sources on the Internet for data relevant to the search query, process the data, and provide the processed data to the user for review. Alternatively, the search engine may search and cache data from the various data sources in advance of receiving the search query, and then provide the cached data to the user when the search query is received. Under either approach, from the user's perspective, the Internet search engine provides the user with near-instantaneous access to several remote data sources via a single gateway.

Notwithstanding these benefits, certain issues arise when the Internet is utilized to search remote data sources. For example, while the amount of data available via the Internet is massive, the amount of computer resources and Internet infrastructure available for communicating, storing, and processing such data is relatively limited. Consequently, an inherent tension exists between providing fast response times and providing comprehensive, accurate results for each search query. Furthermore, because Internet data sources can be affected or changed by computer processes originated by any number of users, in practically any geographic location, and at any time, data returned by an Internet search engine may already be outdated or be outdated soon thereafter.

Accordingly, a need exists for improved systems, methods, and computer program products for updating previously submitted and stored search queries and generating notifications based thereon.

SUMMARY

In one exemplary embodiment, a method for processing a search query includes receiving the search query at one or more computer processors, and storing, by the one or more computer processors, the search query in one or more persistent storage devices. Periodically and automatically thereafter, the one or more computer processors retrieve the search query from the one or more persistent storage devices, retrieve, using an iterative optimization algorithm, source data that relates to the search query from one or more backend data sources, and generate responses for the search query based on the retrieved source data. The method further includes determining whether each of the responses is notification eligible based on search criteria included in the search query, and notifying a user of each response determined notification eligible.

In some embodiments, the search query may include a termination point, and the operations may be performed periodically and automatically until the termination point is reached. In some embodiments, the one or more backend data sources may include multiple backend data sources, and retrieving the first source data from the one or more backend data sources using the iterative optimization algorithm may include retrieving first backend data from a first one of the one or more backend data sources based on a first one of the search criteria. In addition, retrieving the first source data may include filtering the first backend data based on a first satisfaction threshold and a first portion of the search criteria that is relevant to the first backend data, retrieving second backend data from a second one of the one or more backend data sources based on a second one of the search criteria and the filtered first backend data, and filtering the second backend data based on a second satisfaction threshold and a second portion of the search criteria that is relevant to the second backend data. The first source data may be based on the filtered first backend data and on the filtered second backend data.

The first backend data may include multiple results, and filtering the first backend data based on the first satisfaction threshold and the first portion of the search criteria that is relevant to the first backend data may include applying one or more first fuzzy functions that are derived from the first portion of the search criteria to each of the first results to calculate a first satisfaction value for each first result. Filtering the first backend data may also include comparing the first satisfaction value for each first result with the first satisfaction threshold, and filtering the first results by determining, as second results, each first result for which the first satisfaction value is greater than the first satisfaction threshold. Moreover, each of the search criteria of the search query may be associated with a weight, and each of the one or more first fuzzy functions may be associated with one of the first portion of the search criteria. In this case, applying the one or more first fuzzy functions to each first result to calculate the first satisfaction value for each first result may include multiplying an output of each first fuzzy function with the weight associated with the search criterion that is associated with the respective first fuzzy function.

Filtering the first backend data may further include applying one or more second fuzzy functions that are derived from a third portion of the search criteria that is relevant to the first backend data to each of the second results to calculate a second satisfaction value for each second result. Filtering the first backend data may also include comparing the second satisfaction value for each second result with a third satisfaction threshold, and filtering the second results by determining, as third results, each second result for which the second satisfaction value is greater than the third satisfaction threshold. The filtered first backend data may include the third results.

In addition, the second backend data may include multiple results, and filtering the second backend data based on the second satisfaction threshold and the second portion of the search criteria that is relevant to the second backend data may include applying one or more fuzzy functions that are derived from the second portion of the search criteria to each of the results to calculate a satisfaction value for each result. Filtering the second backend data may also include comparing the satisfaction value for each result with the second satisfaction threshold, and determining each result for which the satisfaction value is greater than the second satisfaction threshold. The filtered second backend data may include each determine result.

In some embodiments, generating responses to the search query based on the first source data may include calculating a satisfaction value for each response based on the search criteria. In this case, determining whether each of the responses is notification eligible based on the search criteria may include, for each response, determining whether the satisfaction value for the respective response is greater than a notification threshold, and in response to determining that the satisfaction value for the respective response is greater than the notification threshold, flagging the respective response as eligible for an extra notification. In response to determining that the satisfaction value for the respective response is less than the notification threshold, determining whether the respective response is notification eligible may include determining whether the respective response is within a subset of responses. The satisfaction value for each of the responses in the subset of responses may be greater than the satisfaction value for each of the responses that is not in the subset. In response to determining that the respective response is within the subset, the respective response may be flagged as eligible for a periodic notification. In response to determining that the respective response is not within the subset, the respective response may be determined as not notification eligible.

In some embodiments, the method further includes storing the responses in the one or more persistent storage devices, and after the responses are stored, automatically receiving, via a push mechanism, or retrieving, via a pull mechanism, second source data from the one or more backend data sources that relates to at least one of the responses. The method may further include retrieving the at least one of the responses from the one or more persistent storage devices, updating one or more of the retrieved at least one of the responses based on the second source data, and determining whether each of the one or more updated responses is notification eligible. The method may also include notifying the user of each updated response determined notification eligible.

In addition, determining whether each of the one or more updated responses is notification eligible may include, for each updated response, determining whether the respective updated response includes a subscription. In response to determining that the respective updated response includes the subscription, the respective updated response may be added to a high priority queue. In response to determining that the respective updated response does not include the subscription, the respective updated response may be added to a low priority queue. The method may further include determining whether each updated response in the high priority queue is notification eligible, and thereafter, determining whether each updated response in the low priority queue is notification eligible.

Determining whether each of the responses in the high priority queue is notification eligible may include, for each updated response in the high priority queue, determining whether the respective updated response satisfies a subscription notification threshold for the respective response. In response to determining that the respective updated response satisfies the subscription notification threshold for the respective response, the respective updated response may be flagged as eligible for a subscription notification. Alternatively, in response to determining that the respective updated response does not satisfy the subscription notification threshold for the respective response, the method may include determining whether the respective updated response satisfies an extra notification threshold for the search query. In response to determining that the respective updated response satisfies the extra notification threshold for the search query, the respective updated response may be flagged as eligible for an extra notification. In response to determining that the respective updated response fails to satisfy the extra notification threshold for the search query, the method may include determining whether the respective updated response satisfies a periodic notification threshold for the search query. In response to determining that the respective updated response satisfies the periodic notification threshold for the search query, the respective updated response may be flagged as eligible for a periodic notification. In response to determining that the respective updated response fails to satisfy the periodic notification threshold for the search query, the method may include determining that the respective updated response is not notification eligible.

Similarly, determining whether each updated response in the low priority queue is notification eligible may include, for each updated response in the low priority queue, determining whether the respective updated response satisfies an extra notification threshold for the search query. In response to determining that the respective updated response satisfies the extra notification threshold for the search query, the respective updated response may be flagged as eligible for an extra notification. In response to determining that the respective updated response fails to satisfy the extra notification threshold for the search query, the method may include determining whether the respective updated response satisfies a periodic notification threshold for the search query. In response to determining that the respective updated response satisfies the periodic notification threshold for the search query, the respective updated response may be flagged as eligible for a periodic notification. In response to determining that the respective updated response fails to satisfy the periodic notification threshold for the search query, the method may include determining that the respective updated response is not notification eligible.

In another exemplary embodiment, a system for processing a search query includes one or more computer processors and a memory storing instructions that upon execution by the one or more computer processors cause the system to, in response to receiving the search query, store the search query in one or more persistent storage devices. Periodically and automatically thereafter, the instructions upon execution cause the system to retrieve the search query from the one or more persistent storage devices, retrieve, using an iterative optimization algorithm, source data that relates to the search query from one or more backend data sources, and generate a plurality of responses for the search query based on the retrieved source data. The instructions upon execution further cause the system to determine whether each of the responses is notification eligible based on search criteria included in the search query, and notify a user of each response determined notification eligible.

In additional embodiments, the instructions stored on the memory may, upon execution, cause the system to perform any one or more of the functions and/or implement any one or more of the features described above in connection with the exemplary method.

In a further exemplary embodiment, a computer program product for processing a search query includes a non-transitory computer-readable medium and instructions stored on the non-transitory computer-readable medium that upon execution by one or more computer processors cause the one or more computer processors to, in response to receiving the search query, store the search query in one or more persistent storage devices. Periodically and automatically thereafter, the instructions upon execution cause the one or more computer processors to retrieve the search query from the one or more persistent storage devices, retrieve, using an iterative optimization algorithm, source data that relates to the search query from one or more backend data sources, and generate a plurality of responses for the search query based on the source data. The instructions upon execution further cause the one or more computer processors to determine whether each of the responses is notification eligible based on search criteria included in the search query, and notify a user of each response determined notification eligible.

In additional embodiments, the instructions stored on the non-transitory computer-readable medium may, upon execution, cause the one or more processors to perform any one or more of the functions and/or implement any one or more of the features described above in connection with the exemplary method.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
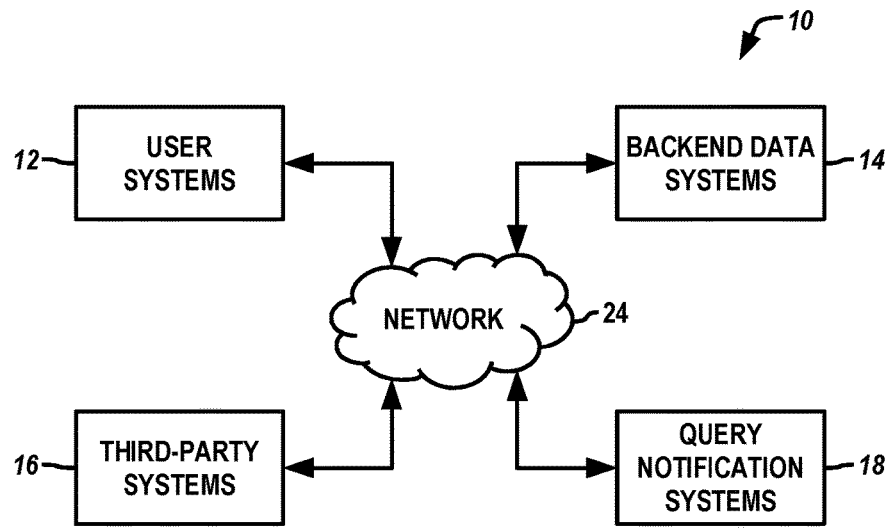
FIG. 1 is a diagrammatic view of an exemplary operating environment for processing a search query that includes a plurality of computer systems in communication via a network.

The embodiments described herein generally relate to systems, methods, and computer program products for processing previously submitted and stored search queries and generating notifications based on such processing. For example, a search query submitted by a user may be persistently stored in a non-volatile memory device. The search query may include search criteria that define the parameters for an Internet search of online backend data sources. In one embodiment, the search query may be a travel wish, and the search criteria may include travel criteria that define the parameters of a desired trip. Non-limiting examples of such travel criteria may include one or more of a budget, a travel length, travel dates, destinations, brands, activities, ratings, amenities, and the like. Moreover, the travel criteria of the travel wish may identify an interest in multiple types of products and/or multiple service providers that implicate more than one backend data source.

Once stored, the search query may be automatically retrieved at regular or irregular intervals for processing. More particularly, one or more backend data sources relevant to the search query may be searched based on the search criteria of the search query, and responses to the search query, such as proposed travel solutions, may be generated based on the retrieved data. The data search may be optimized based on the user's preferences, which may include both explicit preferences (e.g., the search criteria, user profile preferences) and implicit preferences (e.g., data mined from similar search queries and historic data). For example, in the case of a travel wish that implicates multiple backend data sources, initial backend data may be retrieved from one of the backend data sources, and thereafter filtered to discard any portion that fails to satisfy a satisfaction threshold that is based on the user's preferences. The remaining portion of the initial backend data may then serve to limit the data searched in and returned from another one of the backend data sources. In this way, the speed in which responses are built for a search query is improved because less data is utilized to generate the responses as compared to searching each backend data source based on the search criteria alone. Moreover, because the data is limited to that which satisfies a satisfaction threshold, which may be determined or specified so as to optimize responses relative to the search criteria of the search query, the set of generated responses is improved, as it omits responses that are likely of little or no interest to the user.

Once the responses have been generated, a determination may be made for each generated response of whether the response is notification eligible (i.e., whether the user who submitted the search query should be notified or alerted of the response). For example, each generated response may be compared to one or more previous responses generated and stored for the search query. In general, a response generated for a search query may differ from previously generated responses if a change occurs in the searched backend data sources between the previous responses being generated and the current responses being generated. If a current response has not changed from the previous responses, or if the change is insignificant, then a determination may be made to not notify the user. Alternatively, if a current response does represent a significant change from the previous responses (e.g., the current response includes a new travel solution or a significant price change for a previously generated travel solution), a determination may then be made of whether the user should be immediately notified of the current response, or notified at a later time, such as in a next periodic notification. Each of these determinations may be made based on the user's explicit and/or implicit preferences. In this way, the user is kept up to date of significant changes or updates in backend data sources at the right time, and is not bothered with changes or updates that are not significant enough to report.

Additionally or alternatively, when a change or update occurs in a backend data source that relates to a previously stored response, an update of the previously stored response may automatically be triggered. As before, a determination may then be made as to whether the user should be notified of the updated response, thereby enabling the user to know about the update in approximately real time. These and other features are described in more detail below.

FIG. 1 illustrates an operating environment 10 that may include one or more user systems 12, one or more backend data systems 14, one or more third-party systems 16, and one or more query notification systems 18. Each of these systems may communicate with one another via a network 24. Moreover, any two or more of these systems may be combined with one another in a single system.

The user systems 12 may include any computer system that enables a user to input and submit a search query, such as via the Internet, to one of the backend data systems 14 or one of the third-party systems 16. Non-limiting examples of user systems 12 may include mobile computing devices, tablets, desktop computers, laptop computers, and the like. As further examples, a user system 12 may be that of any traveler or customer, or that of any agent, such as a travel agent, acting on behalf of a traveler or customer. A search query that is input via a user system 12 may include search criteria that define the parameters for searching backend data sources hosted on one or more of the backend data systems 14 and/or on one or more of the third-party systems 16. In one embodiment, the search query may be a travel wish, and may include travel-specific search criteria such as travel dates, a destination location, a budget, and the like.

Once submitted, the search query may be transmitted, such as over the network 24, to one of the backend data systems 14 or to one of the third-party systems 16. More particularly, a user may direct a user system 12 to access a graphical user interface (e.g., a website) hosted by a backend data system 14 or a third-party system 16, and then utilize the graphical user interface to enter and submit a search query to the hosting system.

The backend data systems 14 may include any system that is primarily affiliated with and/or operated by an original provider of data utilized to respond to a search query. More particularly, each of the backend data systems 14 may store the backend data of the original data provider affiliated therewith, and may be configured facilitate the original data provider's business operations. In the case of a travel wish search query, for example, each backend data system 14 may be affiliated with and/or operated by a particular travel provider, such as a hotel, an airline, a car rental company, a train company, or the like, and may store the inventory data and the reservation data of the travel provider. Each backend data system 14 may further be configured to enable users, such as via a user system 12, to search available travel products of the travel provider affiliated therewith, and the available travel products of the travel provider's partners, and thereafter purchase travel products directly from or through the travel provider.

The third-party systems 16 may include any system that is not primarily affiliated with and/or operated by an original data provider, but nevertheless enables a user to search the backend data of an original data provider. More particularly, the third-party systems 16 may maintain a link to each of the backend data systems 14, and may be configured to retrieve and/or cache backend data therefrom. In this way, a third-party system 16 may enable users to search the backend data of multiple backend data systems 14 via a single search query submitted to the third-party system 16. Non-limiting examples of third-party systems 16 include Online Travel Agencies (OLTA's) and Global Distribution Systems (GDS's).

Each of the backend data systems 14 and/or third-party systems 16 may be configured to transmit a received search query to one of the query notification systems 18. In response to receiving a search query, a query notification system 18 may be configured to persistently store the search query. Thereafter, at regular or irregular intervals, the query notification system 18 may be configured to retrieve the search query from the persistent storage, retrieve backend data from one or more of the backend data systems 14 and/or the third-party systems 16 based on the search criteria of the search query, and generate one or more responses for the search query based on the retrieved data. The query notification system 18 may further be configured to determine whether each of the one or more generated responses is notification eligible such that the user who submitted the search query should be notified of the response. If so, then the query notification system 18 may be configured to generate a notification that informs the user of the response, such as via an E-mail, text, instant message, push notification, and the like.

For example, a user may submit a travel wish search query to either a backend data system 14 or a third-party system 16, which may thereafter transmit the travel wish to a query notification system 18. In response to receiving the travel wish, the query notification system 18 may persistently store the travel wish, and may periodically query one or more of the backend data systems 14 and/or the third-party systems 16 for data indicative of available travel products based on the travel criteria in the travel wish. From the received data, the query notification system 18 may generate travel solutions that optimize the travel criteria of the travel wish. Once these travel solutions are generated, the query notification system 18 may notify the user of at least those travel solutions in which the user is likely to be very interested. In this way, by submitting a travel wish once, the user is able to automatically receive notifications of good travel solutions for the travel wish that incorporate significant changes relevant to the travel wish, such as a new travel product added by a service provider or a price change relating to a previously posted travel product, that occur in the backend data sources after the travel wish is submitted.

Figure 2:
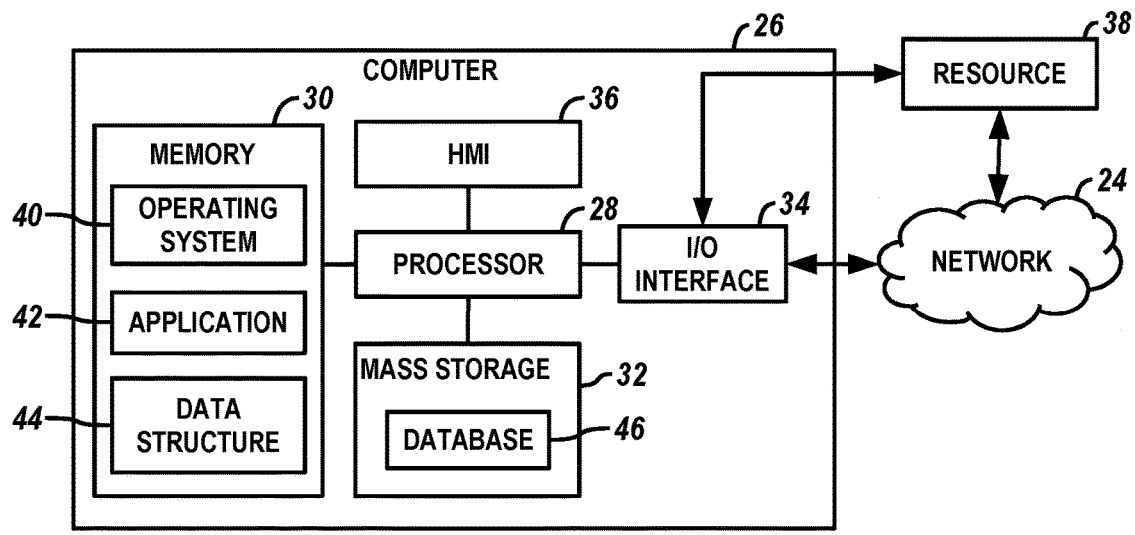
FIG. 2 is a diagrammatic view of an exemplary computer system of FIG. 1.

Referring now to FIG. 2, the user systems 12, the backend data systems 14, the third-party systems 16, and the query notification systems 18 of operating environment 10 may be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources 38 may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

The processor 28 may operate under the control of an operating system 40 that resides in the memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or the one or more external resources 38. The application 42 may thereby work cooperatively with the network 24 or the external resources 38 by communicating via the I/O interface 34 to provide the various features, functions, applications, processes, or modules comprising embodiments of the invention. The application 42 may also have program code that is executed by the one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

Figure 3:
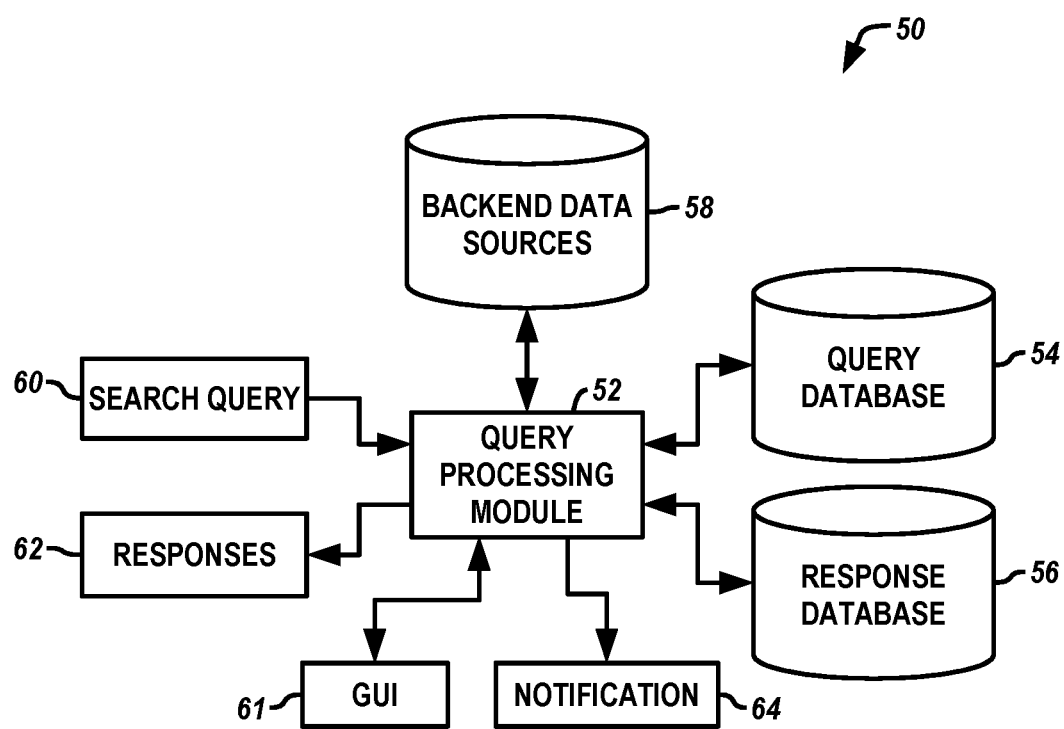
FIG. 3 is a diagrammatic view of a processing architecture that may be implemented by one or more of the computer systems of FIG. 1.

FIG. 3 illustrates a processing architecture 50 for processing a search query 60 so that a user may be notified when changes to backend data sources 58 significantly affect the search query 60. The processing architecture 50 may be provided by one or more of the systems of operating environment 10, and may include a query processing module 52, a query database 54, a response database 56, and one or more backend data sources 58.

In operation, the query processing module 52 may receive a search query 60 that is submitted by a user, such as via a user system 12. Specifically, a user may access a graphical user interface (GUI) 61 generated by the query processing module 52 via a user system 12, and utilize the GUI 61 to create and submit the search query 60. In response to receiving the search query 60, the query processing module 52 may be configured to store the search query 60 in the query database 54. The query database 54 may be hosted on one or more persistent storage devices, such as one or more of the mass storage memory devices 32 (FIG. 2).

Periodically thereafter, the query processing module 52 may be configured to automatically retrieve the search query 60 from the query database 54, retrieve source data that relates to the search query 60 from the backend data sources 58, and generate responses 62 for the search query 60 based on the retrieved source data. In one embodiment, the query processing module 52 may be configured to retrieve the source data using an iterative optimization algorithm, which enables the generation of responses 62 that are particularly relevant to the user while also optimizing the utilization of system resources. Specifically, the iterative optimization algorithm may minimize the number of requests that are transmitted to the backend data sources 58 from the query processing module 52, may minimize the amount of data that is returned by the backend data sources 58 to the query processing module 52, and may maximize the relevancy of the returned data, each of which enables the query processing module 52 to generate better responses 62 faster.

After the responses 62 are generated, the query processing module 52 may be configured to determine whether each response 62 is notification eligible. More particularly, the query processing module 52 may determine whether each response 62 is worthy of being shared with the user via a notification 64, such as based on user-specified preferences and the search criteria of the search query 60. In this way, after the search query 60 is submitted, if data in a backend data source 58 changes such that a new response 62 for the search query 60 is available (e.g., a service provider adds a new relevant travel product), or such that a previously generated response 62 no longer accurately reflects the data in the backend data source 58 and needs to be updated (e.g., a travel product is cancelled, the price of a travel product changes), the query processing module 52 may determine whether the user should be notified of the new or updated response 62.

Specifically, the query processing module 52 may be configured to determine whether a response 62 is so exceptional such that it warrants an immediate or extra notification 64 (e.g., via a text or an E-mail), whether the response 62 is of enough potential interest to the user such that it should be included in a next periodic notification 64, or whether the user should simply not be notified of the response 62. In this way, system resources are not wasted on notifying users of responses 62 in which the user is likely to have little or no interest. Moreover, because system resources are utilized each time a notification 64 is generated and sent to the user, by limiting the number of notifications 64 that are sent to the user to those in which the user is most likely to be interested, and grouping multiple notification eligible responses 62 together in a single notification 64, such as in a periodic notification 64, the query processing module 52 may further optimize the utilization of system resources.

In one embodiment, the search query 60 may comprise a travel wish that includes travel criteria defining the parameters of a trip in which the user is interested, and each of the backend data sources 58 may include pricing data for available travel products of one or more travel providers. For example, one of the backend data sources 58 may include data indicating the price of available travel products of one or more airlines (e.g., available flights), another backend data source 58 may include data indicating the price of available travel products of one or more train operators (e.g., available train segments), and yet another backend data source 58 may include data indicating the price of available travel products of one of more hotels (e.g., available rooms). In general, a travel product of a service provider may include any saleable item or service of the service provider.

Continuing with the travel wish example, after the travel wish is stored in the query database 54, the query processing module 52 may be configured to automatically and periodically retrieve the travel wish from the query database 54, retrieve source data indicating the price of available travel products from the backend data sources 58 based on the travel criteria of the travel wish, and build one or more travel solutions for the travel wish based on the retrieved source data. Thereafter, the query processing module 52 may determine whether each travel solution is notification eligible, and notify the user accordingly. In this way, the user is kept up to date of new travel solutions that strongly relate to the travel wish and that became available after the search query 60 is submitted.

After generating responses 62, the query processing module 52 may be configured to store the responses 62 in the response database 56, which may likewise be stored on one or more persistent storage devices. Periodically thereafter, the query processing module 52 may retrieve source data that relates to the responses 62 from the backend data sources 58. Alternatively, when a change relevant to one or more of the responses 62 occurs in a backend data source 58, the query processing module 52 may automatically receive source data that indicates the change, such as via a push mechanism implemented at the backend data sources 58. In either case, once the source data is present, the query processing module 52 may retrieve the stored responses 62 relevant to the source data, update each retrieved response 62 that is no longer accurate based on the retrieved source data, and determine whether the user should be notified of each updated response 62.

In some embodiments, the processing architecture 50 may also differentiate between two types of users: passive users and VIP users. Both passive users and VIP users may be granted the ability to use basic functionalities, such as creating a search query 60 and receiving notifications 64 of responses 62. However, VIP users may also have access to personalized versions of the GUI 61 that enable more comprehensive interaction with the processing architecture 50. Furthermore, VIP users may receive priority processing relative to search queries 60 and notifications 64. In other words, when the query processing module 52 processes search queries 60 and notifications 64, it may be configured to process those of VIP users before passive users. VIP users may also be given more data capacity, which may increase the number of responses 62 that can be stored for the user, and may increase the number of responses 62 of which the user may be notified.

Figure 4:
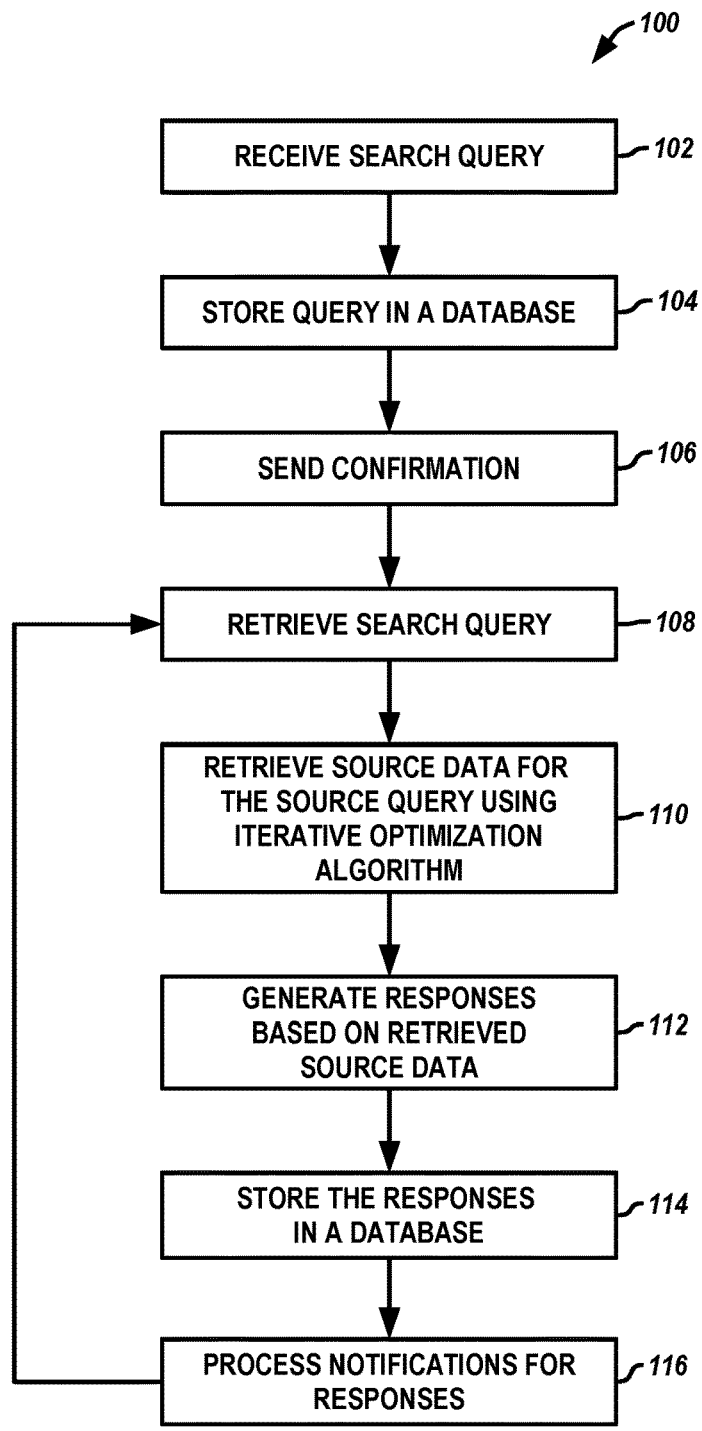
FIG. 4 is a flowchart of an exemplary process for generating responses for a previously submitted and stored search query that may be performed by the processing architecture of FIG. 3.

FIG. 4 illustrates a process 100 for generating responses 62 for a submitted and stored search query 60. The process 100 may be performed by the processing architecture 50.

In block 102, a search query 60 may be received, such as at the query processing module 52. The search query 60 may include search criteria that define parameters for a search of the online backend data sources 58. In some embodiments, the search query 60 may be a travel wish, and the search criteria may be travel criteria that define the parameters of a trip in which the user is interested. In particular, a user, such as an airline agent, travel agent, or traveler, may utilize a user system 12 to access the GUI 61 of the processing architecture 50. The user may then utilize the GUI 61 to create a travel wish by defining various travel criteria.

The GUI 61 may feature both mandatory and optional travel criteria for the user to define (i.e., give a value to). Mandatory travel criteria, which the user must define, may include a departure place and an available budget. Optional travel criteria, which the user may or may not define, may include a departure date, travel product types (e.g., air, train, hotel, car rental, taxi, coach, ferry, ground transportation, local events), a number of persons in a traveler's party, an age of each person in the traveler's party, an arrival place, an arrival date, a maximum number of connections, and date flexibility. In addition, the GUI 61 may enable a user to define a period of time with a travel duration and/or one or more weekdays for a travel wish (e.g., a trip from Friday to Sunday within a 3 month period). By requiring that only a minimum number of travel criteria be defined (i.e., the mandatory travel criteria), the GUI 61 may grant the user with flexibility to define a travel wish such that he or she will be notified of a wide variety of travel solutions when the travel wish is processed. In additional embodiments, one or more of the travel criteria described above as optional may be mandatory, and one or more or the travel criteria descried above as mandatory may be optional.

In some embodiments, the GUI 61 may also feature two or more modes in which a user may create a travel wish. One mode may be a basic mode that enables the user to enter only basic search criteria, such as a departure place, an available budget, and/or a departure date. The basic mode may be useful for travelers that do not have a precise view of the trip they want to make. Another available mode may be an expert mode, which may generally be for travelers that know more specific details of their desired trip. The expert mode may enable the user to enter the travel criteria of the basic mode, and one or more of the additional travel criteria described above.

The GUI 61, such as when operating in expert mode, may also be adapted to serve travelers that travel on a regular basis. In particular, the GUI 61 may enable a user to create a travel wish that includes multiple sub-travel wishes. Each sub-travel wish may correspond to a different trip that relates to an overall travel wish, such as a traveler's wish to take the same trip several times a year. In other words, each sub-travel wish may correspond to a traveler's desire to take a same trip on multiple dates, or take a same trip over multiple periods of time (e.g., take trip A once a month). When a travel wish includes sub-travel wishes, each sub-travel wish may be processed for travel solutions and notification eligibility separately, and the user may receive separate notifications 64 for each sub-travel wish.

Furthermore, the GUI 61, such as when operating in expert mode, may enable the user to define additional travel criteria that are specific to each type of travel product. For example, in relation to hotel travel products, the user may be able to define additional travel criteria specific to hotels such as hotel type, brand, minimum rating, radial distance to a city center, and preferred services (e.g., breakfast, pool, lunch, cleaning service, 24-hour front desk, bathroom in the room, internet connection, laundry service, spa). The GUI 61 may be configured to dynamically present such additional travel criteria options to the user upon the user's selection of a particular type of travel product. For example, in response to a user selecting air travel products for a travel wish, the GUI 61 may be configured to display travel criteria specific to air travel products (e.g., class, seat location, travel times, brand) for the user's definition.

In addition to enabling a user to define travel criteria for a travel wish, the GUI 61 may enable the user to identify other parameters to be included in the travel wish. For example, the GUI 61 may enable a user to assign a priority level or weight to each or most of the defined travel criteria. In general, the priority level or weight assigned to a defined travel criterion indicates a level of importance of that criterion to the user. As described in more detail below, such levels or weights may be utilized as part of the iterative optimization algorithm to retrieve source data in an optimal manner, and to determine whether a response 62 generated for the search query 60 is notification eligible.

As another example of additional parameters, the GUI 61 may enable a user to specify settings for notifications 64, such as periodic notifications 64, that are sent to the user for a travel wish. For example, the user may define the frequency that notifications 64, such as periodic notifications 64, are sent to the user (e.g., once per two weeks, once per week, twice per week), and the maximum number of responses 62 that may be included in a notification 64.

The GUI 61 may also enable the user to enter a termination point that indicates when the processing architecture 50 should discontinue processing the submitted search query 60 and stop sending notifications 64 to the user. In other words, the processing architecture 50 may continue generating new responses 62 for a search query 60, refreshing previously generated responses 62 for a search query 60, and determining notification eligibility of responses 62 for a search query 60 until the termination point is reached. In the case of a travel wish, GUI 61 may allow the user to set the termination point as a time or date up to the day before the departure date defined for the travel wish. If no termination point is defined by the user, then a default termination point of the day before the defined departure date may be inferred.

Including a termination point in each travel wish optimizes the utilization of system resources by ensuring that processing is discontinued for travel wishes that are no longer of interest to the user, such as after the departure date of interest to the user has past. When a termination point for a travel wish is reached, the processing architecture 50 may send a notification 64 relaying this information to the user. The notification 64 may include the best responses 62 found for the search query 60 during the search query's 60 duration, which may be based on an overall satisfaction value, or response satisfaction value (RSV), calculated for each response 62 generated for the search query 60. The calculation of RSV's is described in more detail below with reference to FIG. 7.

In block 104, in response to the search query 60 being received, the search query 60 may be stored in one or more persistent storage devices, such as one or more of the mass storage memory devices 32 (FIG. 2). More particularly, the search query 60 may be stored in a database, such as the query database 54, that is hosted on the one or more persistent storage devices. In block 106, a confirmation message, such as an E-mail, may be sent to the user that summarizes the search query 60, such as at a user system 12. After the search query 60 is stored, the GUI 61 may enable the user to recall the search query 60 from the query database 54, visualize the search query 60, and apply any desired changes.

In block 108, the search query 60 may be retrieved from the persistent storage devices, such as by the query processing module 52. More particularly, the query processing module 52 may be configured to retrieve all new search queries 60 submitted by users from the query database 54 on a periodic basis, such as once per day. Thus, if a time equal to a set period has passed since the last time new search queries 60 were retrieved and processed, then the query processing module 52 may be configured to retrieve all new search queries 60 stored in the query database 54, including the search query 60 received in block 102.

In block 110, source data for the search query 60 may be retrieved using an iterative optimization algorithm, such as by the query processing module 52. In general, source data may be described as the actual data on which the generation of responses 62 is based. In particular, the query processing module 52 may be configured to implement the iterative optimization algorithm to retrieve source data that relates to the search query 60 from the backend data sources 58. For example, when the search query 60 is a travel wish that indicates an interest in air travel products, hotel travel products, and train travel products, the query processing module 52 may query the backend data sources 58 containing pricing and availability data for each type of travel product indicated in the travel wish.

As previously described, the iterative optimization algorithm minimizes the utilization of system resources and minimizes the amount of data returned from the backend data sources 58 during the source data retrieval process, while assuring that the source data includes results in which the user is most likely to be interested. Specifically, the iterative optimization algorithm is configured such that backend data is retrieved from the backend data sources 58 in multiple iterations, where the backend data retrieved in each iteration contains a portion of the source data. The backend data retrieved in each iteration may be filtered based on one or more of the search criteria to determine an optimal portion of the backend data relative to the search criteria, which may then be utilized to retrieve backend data in a next iteration and/or form the source data. In particular, the source data may include at least some of the optimal portion of backend data determined for each iteration of retrieved backend data. In some cases, the optimal portion of backend data retrieved in an iteration may include most or all of the backend data retrieved in that iteration. The iterative optimization algorithm is described in greater detail with reference to FIG. 5.

In block 112, responses 62 to the search query 60 may be generated based on the retrieved source data, such as by the query processing module 52. More particularly, after the source data is retrieved, the query processing module 52 may be configured to compile the source data into the responses 62. To this end, the query processing module 52 may aggregate the backend data retrieved from different backend data sources 58 to form the responses 62, and may calculate an RSV for each response 62, which may be based on the weights assigned to the search criteria of the search query 60.

In block 114, each of the generated responses 62 may be stored in a database, such as the response database 56. In particular, the query processing module 52 may transmit the generated responses 62 to the response database 56. The response database 56 may be hosted on one or more persistent storage devices, such as one or more of the mass storage memory devices 32 (FIG. 2). The responses 62 may be stored in the response database 56 such that each response 62 is associated with a creation-timestamp for the response 62 and the RSV calculated for the response 62.

In block 116, each response 62 may be processed for notification eligibility, such as by the query processing module 52. In particular, the query processing module 52 may, at regular or irregular periods, or immediately after a response 62 is generated and/or stored, determine whether the generated responses 62 are notification eligible. In response to determining that a response 62 is notification eligible, the query processing module 52 may be configured to notify the user of the response 62 via a notification 64. Determining notification eligibility for responses 62 generated for new search queries 60 is described in greater detail in reference to FIG. 9.

After the responses 62 are generated and/or stored, one or more of blocks 110 through 116 may continue to be performed automatically and periodically, such as by the query processing module 52. Specifically, the query processing module 52 may be configured to automatically perform one or more of blocks 110 through 116 on a regular or irregular periodic basis until the termination point included in the search query 60 is reached. In some embodiments, the rate or rates in which the query processing module 52 automatically repeats the performance of each block for the search query 60 may differ from the rate in which the query processing module 52 retrieves and processes new search queries 60. For example, the query processing module 52 may retrieve new search queries 60 once a day, and retrieve previously processed search queries 60 every 3 days.

If, during a subsequent performance of one or more of blocks 110 through 114, new responses 62 are generated, or a determination is made that a previously generated response 62 no longer accurately reflects the data stored in the backend data sources 58 and should be updated, the query processing module 52 may add the new or updated responses 62 to the previously generated responses 62 stored in the response database 56. In this way, when the data of a backend data source 58 changes in a manner relevant to the search query 60, the user may be notified of the change. Furthermore, by adding new and updated responses 62 to the response database 56 without deleting the previously generated responses 62, the query processing module 52 may track the evolution of responses 62 over the duration of the search query 60, which may enable the query processing module 52 to provide predictions to a user about whether a response 62 is likely to change.

Once a search query 60 is created and a set of responses 62 is generated and stored for the search query 60, users may be able to utilize the GUI 61 to visualize the responses 62 for the search query 60. The user may then be able to select a response 62 to view details thereof. For example, when each response 62 is a travel solution, the user may select one of the travel solutions to view details about the travel products in the selected solution. In the specific case of a hotel travel product, the user may be able to view the location of the hotel on a map. In addition, the GUI 61 may enable a user to select a response 62, and thereafter view a price trend associated with the response 62 in order to determine whether the response 62 is likely to change and by how much. In some embodiments, this feature may only be available to VIP users.

After responses 62 are generated for a search query 60, a user may also be able to utilize the GUI 61 to view the responses 62 and manually select one to re-elaborate. In response to receiving a user's request to re-elaborate a response 62, the query processing module 52 may query the backend data sources 58 for data that matches the selected response 62. If such data is found and returned from the backend data sources 58, then the query processing module 52 may rebuild the selected response 62 based on the returned data. The rebuilt response 62 may then be presented to the user via the GUI 61. If the rebuilt response 62 differs from the selected response 62, which may occur as a result of the data on which the selected response 62 was based being changed in the backend data sources 58 (e.g., a price or availability change for a particular flight), then the selected response 62 may be updated in the response database 56 with the rebuilt response 62. Alternatively, the rebuilt response 62 may be stored along with the selected response 62 in the response database 56 so as to track the evolution of the selected response 62 and enable price trend analysis. If the query processing module 52 is unable to retrieve data from the backend data sources 58 that matches the selected response 62, such as if the data on which the selected response 62 was based has been removed from the backend data sources 58, then the GUI 61 may notify the user of the inexistence of the selected response 62, and update the response database 56 accordingly (e.g., delete the selected response 62, otherwise indicate that the selected response 62 is no longer available).

In addition, the GUI 61 may enable a user to select one or more responses 62 in which he or she is interested, and request a summary of such selected responses 62 via an e-mail. In response, the query processing module 52 may generate and send an e-mail that displays details of each selected response 62.

Further after responses 62 are generated for a search query 60 and stored in the response database 56, users may be able to utilize the GUI 61 to subscribe to one or more of the responses 62. In this way, the user may designate responses 62 that are of a particular interest, and request notifications 64 when, due to a refresh, the response 62 experiences a significant change. The processing of responses 62 including subscriptions is described in greater detail below in reference to FIGS. 10 and 11.

Figure 5:
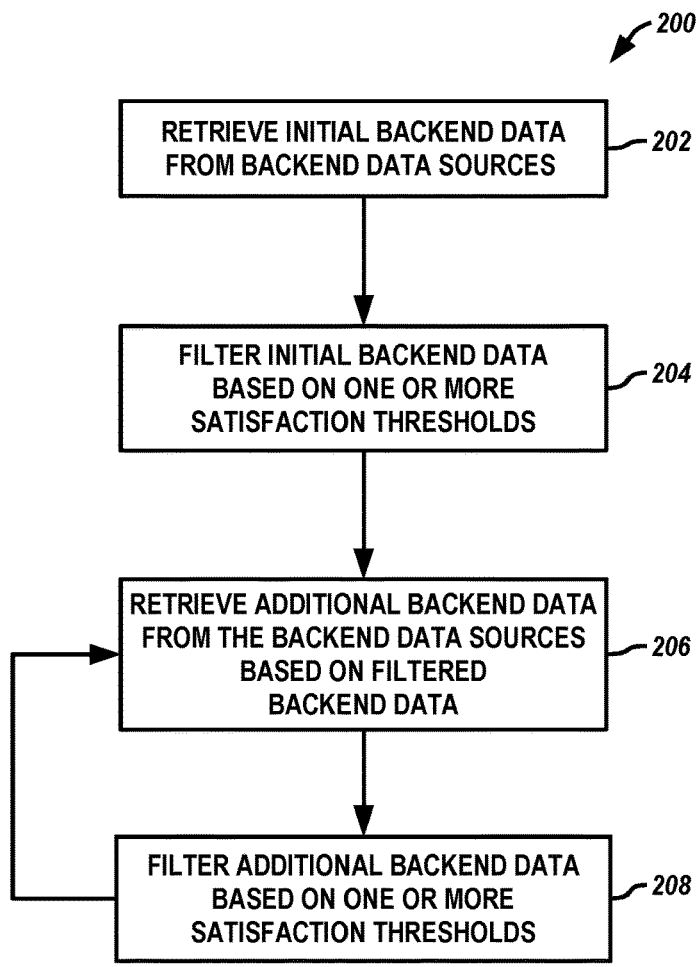
FIG. 5 is a flowchart of an exemplary process for retrieving source data from one or more backend data sources using an iterative optimization algorithm that may be performed by the processing architecture of FIG. 3.

FIG. 5 illustrates a process 200 for retrieving the source data from the backend data sources 58, such as in block 110 of process 100 (FIG. 3). More particularly, the process 200 illustrates an embodiment of the iterative optimization algorithm that may be utilized to retrieve the source data from the backend data sources 58. The process 200 may be performed by the query processing module 52 of the processing architecture 50.

In block 202, initial backend data that includes a portion of the source data may be retrieved from one or more of the backend data sources 58, such as based on at least one of the search criteria of the search query 60. In general, the one or more backend data sources 58 may include multiple backend data sources 58, and each backend data source 58 may be associated with a different service provider, such as an airline or a hotel, or a different type travel product. Moreover, each backend data source 58 may include data that represents products or results that could be included in a response 62 generated by the query processing module 52.

A response 62 generated by the query processing module 52 for a search query 60 often includes products or results having an inherent dependency. For example, a response 62 in the form of a travel solution that includes connecting air travel products implies that, if the travel products of the travel solution are booked, the later air travel product will not be useable until after the earlier air travel product is used. Similarly, a response 62 in the form of a travel solution that includes an air travel product and a hotel travel product implies that, if the travel products of the travel solution are booked, the hotel travel product will not be useable until after the air travel product is used.

Thus, rather than simply searching all of the data stored in the backend data sources 58 that is potentially relevant to a search query 60 (e.g., for a travel wish indicating an interest in hotel travel products and air travel products, simply searching all of the backend data sources 58 that relate to hotel travel products and air travel products), the query processing module 52 may be configured to perform the search in iterations by initially limiting the search to only some of the relevant data, such as the data relevant to one type of product or result on which another type of product or result will depend. In this way, and as will become more evident below, the query processing module 52 avoids retrieving data for dependent products or results that is later discarded due to a failure to uncover data for satisfactory products or results (e.g., products or results that are of interest to the user based on the travel criteria and assigned weights) that will enable utilization of the dependent products or results. Consequently, the total amount of data that is returned to the query processing module 52 from the backend data sources 58 for processing is minimized, thereby reducing the overall drain on system resources when generating responses 62.

For example, in one embodiment, the search query 60 may be a travel wish that includes travel criteria indicating an interest in transportation travel products (e.g., air and train) and hotel travel products, and includes additional travel criteria for each type of travel product. In this case, because the use of any hotel travel product may depend on the prior use of a transportation travel product, the query processing module 52 may begin retrieving backend data for the travel wish by initially limiting a search of the backend data sources 58 to the data stored therein that relates to transportation products. For example, the query processing module 52 may limit the initial search to data stored in those backend data sources 58 associated with a transportation service provider (e.g., an airline or train). The query processing module 52 may further narrow the search by basing on one or more of the travel criteria in the travel wish, such as one or more of the travel criteria that are particularly relevant to transportation travel products (e.g., dates, budget, arrival place, departure place, booking class, preferred brand, and number of layovers). The limitations applied by the query processing module 52 in this initial search will ensure that the initial backend data received from the backend data sources 58 only includes results in the form of transportation travel products relevant to the travel wish.

In block 204, the initial backend data may be filtered based on one or more satisfaction thresholds and one or more of the search criteria that are relevant to the initial backend data. More particularly, the initial backend data may include multiple results retrieved from the backend data sources 58, such as multiple transportation travel products. The query processing module 52 may compare each result with one or more portions of the search criteria of the search query 60, which may include the one or more search criteria on which the retrieval of the initial backend data was based, that are particularly relevant to the results to determine a partial or layer satisfaction value (LSV) for each result. For example, when each result in the initial backend data is a transportation travel product, the query processing module 52 may compare each transportation travel product with one or more portions of the travel criteria relevant to transportation to determine an LSV for each transportation product. Thereafter, the query processing module 52 may compare the LSV for each result with a determined or specified satisfaction threshold, and filter the results by determining each result for which the LSV is greater than or equal to the satisfaction threshold. In other words, those results for which the LSV is less than the satisfaction threshold may be discarded, and those results for which the LSV is greater than or equal to the satisfaction threshold may be retained. The filtered initial backend data may therefore be considered to include the filtered or retained results, that is, the results of the initial backend data for which the LSV is greater than or equal to the satisfaction threshold.

In some embodiments, this process may be repeated such that the initial backend data is filtered in multiple layers. For example, after the results in the initial backend data have been filtered in an initial layer, such as described in the preceding paragraph, the query processing module 52 may apply another layer in which the retained results are compared with further search criteria relevant to the results, which may include one or more of the search criteria that were utilized to retrieve the initial backend data and/or were not compared in the initial layer. Similar to in the initial layer, another LSV may be determined for each retained result based on the comparison, and the retained results may be filtered by determining each retained result for which the LSV is greater than a satisfaction threshold determined or specified for the current layer. In this case, the filtered initial backend data may be considered to include the filtered or retained results that remain after the last layer of filtering is applied to the initial backend data.

When the initial backend data is filtered in multiple layers, the search criteria compared in the initial layer may be relatively general, and the search criteria compared in each subsequent layer may be increasing specific. For example, when each result in the initial backend data is a transportation travel product, in the initial layer, the results may be compared with general travel criteria of a travel wish that relate to transportation, such as a date, a price, a departure, and an arrival place defined in the travel wish. Thereafter, in a subsequent layer, retained results may be compared with increasingly specific travel criteria relative to transportation, such as a class, a brand, a number of connections, and a transportation type defined in the travel wish. Additional layers may be used to filter the initial backend data than the number of layers described herein, and more or less search criteria may be compared in each layer than those described herein.

In one embodiment, comparing results in the initial backend data to one or more search criteria may include applying one or more fuzzy functions to each result to calculate an LSV for each result. In particular, a fuzzy function $f_i(x_i)$ may be determined for each search criterion being compared, where $f_i(\ )$ is the fuzzy function for the $i^{th}$ criterion being compared, and $x_i$ represents the value of a result for the $i^{th}$ criterion being compared. The fuzzy function determined for a given search criterion may be derived from the value defined by the user for the search criterion in the search query 60. When applied to a given result, each fuzzy function may output a value for the result relative to the criterion associated with the fuzzy function (i.e., the criterion for which the fuzzy function is determined). An LSV may then be determined for the result based on the values generated by each fuzzy function.

When users create search queries 60 such as a travel wish, they are typically requesting the receipt of responses 62 that satisfy the search criteria of the search query 60 as much as possible. As described above, to further define a search query 60, a user may be able to declare the importance of each search criterion by assigning a weight to each criterion, such as using the GUI 61, such that each criterion is associated with a weight. Accordingly, in some embodiments, applying one or more fuzzy functions to a result to calculate an LSV for the result may comprise multiplying each fuzzy function, or the value output by each fuzzy function, with the weight assigned to the criterion for which the fuzzy function is determine. Thereafter, the LSV for a result may be computed by summing each multiplied fuzzy function or value. More particularly, the LSV for a result may be computed using the following formula:

$$LSV = \frac{\sum_{i=o}^{n} f_i(x_i) * w_i}{\sum_{i=0}^{n} w_i}$$

where $f_i$ is a fuzzy function for the $i^{th}$ criterion, $x_i$ is the value for the $i^{th}$ criterion for the given result, and $w_i$ is the weight assigned to the $i^{th}$ criterion. Each LSV calculated for a result may belong to the interval [0,1]. Although an exemplary LSV formation is set forth above, other LSV formulas may be utilized depending on the type of results for which the LSV is being calculated (e.g. hotel-related results, transportation-related results, and so on).

Figure 6:
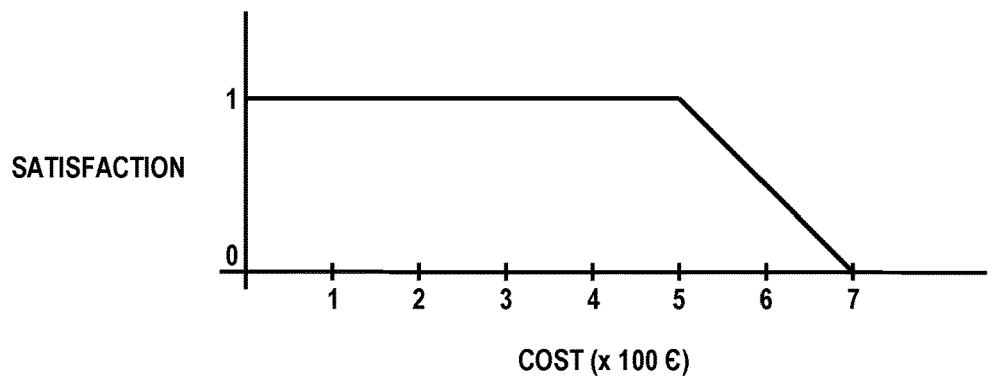
FIG. 6 is a graph of an exemplary fuzzy function that may be utilized in the process of FIG. 5.

FIG. 6 illustrates a graph of an exemplary fuzzy function that may be determined for a travel wish that indicates an interest in transportation travel products and defines a budget of five hundred euros. According to the illustrated graph, if a transportation travel product returned from the backend data sources 58 has a price of five hundred euros or less, the fuzzy function will return a value of one, which indicates that the user will be very satisfied with the transportation travel product in terms of budget. Alternatively, if the price of a returned transportation travel product is more than five hundred euros, the fuzzy function will return a value of less than one, which indicates that the user will be less than fully satisfied with the transportation travel product in relative to budget. The higher the price of a transportation travel product beyond five hundred euros, the less satisfied the user will be relative to budget. Depending on the criterion, different shapes (e.g., triangle, trapezoids, and squares) may be utilized for the fuzzy functions, and such shapes may be customizable by the user via the GUI 61.

Referring again to FIG. 5, in block 206, another iteration of data retrieval may be performed in which additional backend data, which may likewise include a portion of the source data, may be retrieved from one or more of the backend data sources 58 based on the filtered initial backend data, and/or based on one or more of the search criteria of the search query 60. In this way, the additional backend data may include results that are compatible with the results remaining in the filtered initial backend data, and/or that are relevant to the one or more search criteria utilized to retrieve the additional backend data. In other words, each result in the additional backend data may be useable after one or more of the results in the filtered initial backend data are utilized. In some embodiments, the one or more backend data sources 58 from which the additional backend data is retrieved may differ from the one or more backend data sources 58 from which the initial backend data is retrieved, and the search criteria on which retrieval of the additional backend data is based may differ from the search criteria on which retrieval of the initial backend data is based.

For example, when the search query 60 is a travel wish that includes travel criteria indicating an interest in transportation travel products and hotel travel products, and includes additional travel criteria for each type of travel product, the filtered initial backend data may include multiple transportation travel products that the user is likely to be interested in and that were retrieved from one or more backend data sources 58 including information relating to transportation travel products. After the filtered initial backend data is determined, the query processing module 52 may query a different one or more of the backend data sources 58 that include information relating to hotel travel products for a plurality of hotel travel products that are compatible with the transportation products in the filtered initial backend data, and/or that are relevant to one or more of the travel criteria related to hotel travel products defined in the travel wish. By narrowing the search of the subsequent backend data sources 58 based on the filtered initial backend data and/or one or more of the hotel-related travel criteria, the amount of data returned from the subsequent backend data sources 58 is reduced. As a result, less data needs to be processed by the query processing module 52 to generate the travel solutions for the travel wish, which results in faster processing time and minimizes the drain on system resources.

In block 208, the additional backend data may be filtered based on one or more satisfaction thresholds, which may or may not differ from the one or more satisfaction thresholds used to filter the initial backend data, and one or more portions of the search criteria that are relevant to the additional backend data. More particularly, one or more additional layers of filtering may be applied to the additional backend data in which the results of the additional backend data are compared with one or more portions of the search criteria of the search query 60 that are relevant to the additional backend data. The application of each of these additional layers may be performed in a same or similar manner as described above for the initial backend data retrieved from the backend data sources 58. Consequently, the filtered additional backend data may be considered to include the filtered or retained results of the additional backend data that remain after a last layer of filtering is applied to the additional backend data.

In some embodiments, one or more additional iterations of retrieving and/or filtering data from the backend data sources 58 may be performed, such as if a travel wish indicates three or more types of travel products, brands, etc. To this end, after block 208 is performed, the process 200 may return back to block 206 to retrieve further data from the backend data sources 58 based on further portions of the search criteria and previously filtered data. In some embodiments, each subsequent iteration of retrieving data may involve a different one or more backend data sources 58 that are specific to the type of data being retrieved in the iteration (e.g., specific to hotel travel products, to transportation travel products, to a type of transportation travel product such as air, to a particular brand, and so on).

The source data retrieved from the one or more backend data sources 58 may be based on or include at least a portion of each filtered data retrieved from the backend data sources 58, such as at least a portion of the filtered initial data and at least a portion of the filtered additional data. Consequently, generating responses 62 for a search query 60 based on the source data retrieved from the backend data sources 58 may comprise generating the responses 62 based on the filtered initial backend data, filtered additional backend data, and any other filtered data retrieved from the backend data sources 58. For example, each response 62 may include and/or aggregate a result or product from the filtered initial backend data and a result or product from the filtered additional backend data.

Figure 7:
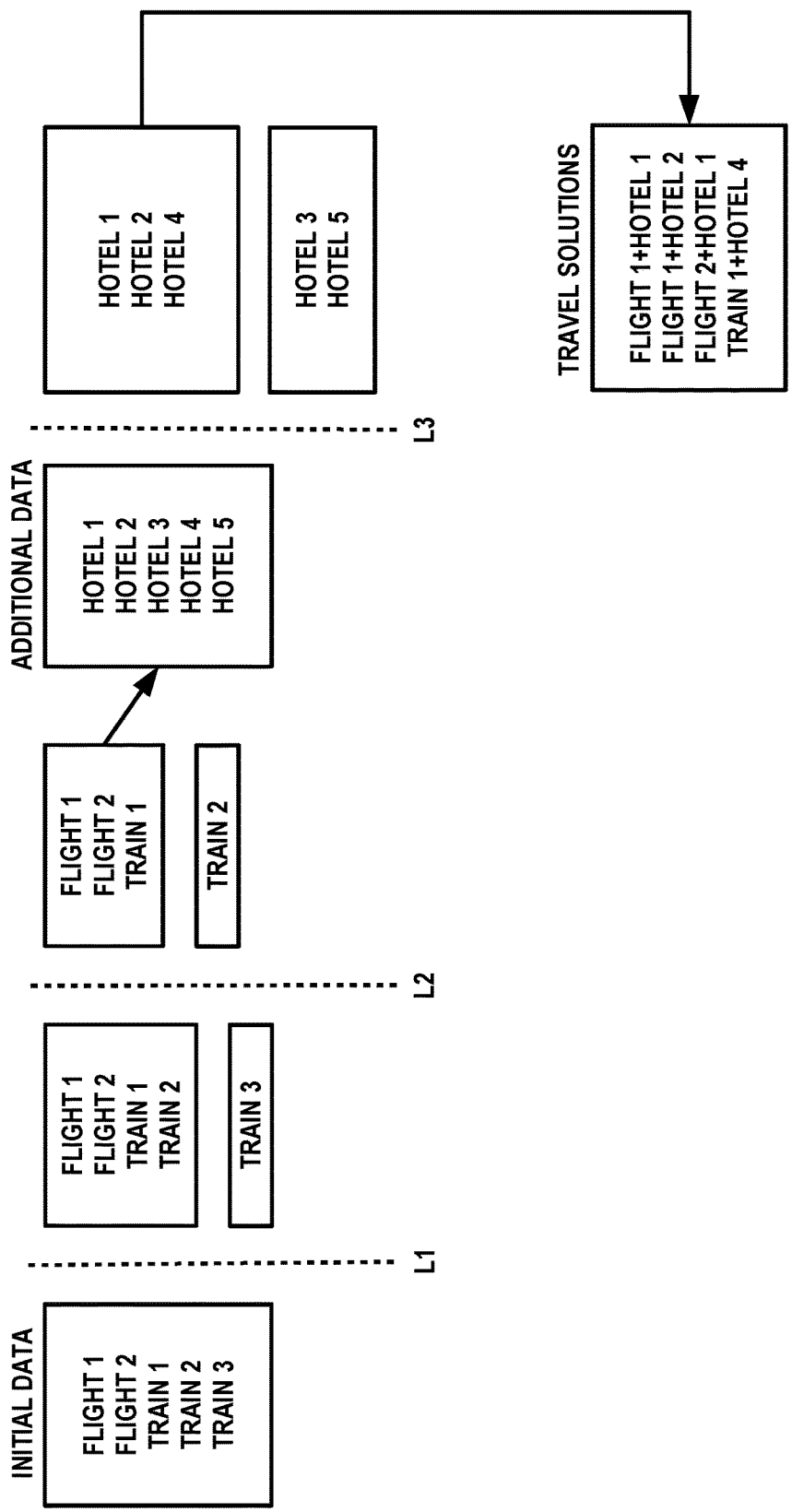
FIG. 7 is an illustration of an example of the process of FIG. 5.

FIG. 7 illustrates a specific example of the iterative optimization algorithm described in FIG. 6. More particularly, the example includes a total of three layers of filtering that are applied to data retrieved from the backend data sources 58 for a travel wish that indicates an interest in transportation travel products, or more particularly an interest in air transportation products and train travel products, and hotel travel products, and that defines travel criteria for each. The three layers may include a general layer L1, a transportation layer L2, and a destination layer L3.

To begin, because use of a hotel travel product may depend on prior use of a transportation travel product, the query processing module 52 may initially query the backend data sources 58 for data that relates to transportation travel products based on one or more of the travel criteria of the travel wish that are relevant to transportation. In particular, the query processing module 52 may limit this search to those backend data sources 58 that include data indicative of pricing and availability of relevant transportation products. Accordingly, in response to issuing the query, the query processing module 52 may receive initial backend data from the backend data sources 58 that indicates the pricing and availability of multiple transportation travel products. In this example, the multiple transportation travel products include Flight 1, Flight 2, Train 1, Train 2, and Train 3.

Thereafter, the query processing module 52 may begin to filter the initial backend data by applying the general layer L1. In the general layer L1, the transportation travel products may be compared to general travel criteria that are relevant to transportation and that are defined in the travel wish, such as date, budget, departure place, and arrival place. The query processing module 52 may then determine an LSV for each transportation travel product based on these comparisons, and may compare the LSV of each transportation travel product to a satisfaction threshold determined or specified for the general layer L1. Those transportation travel products that are not greater than or equal to the satisfaction threshold may be discarded, and the others may be retained. In this example, Flight 1, Flight 2, Train 1, and Train 2 are retained after application of the general layer L1, and Train 3 is discarded.

Thereafter, the query processing module 52 may apply the transportation layer L2 to the transportation travel products retained after the general layer L1. In the transportation layer L2, the retained transportation travel products may be compared to travel criteria that are relevant to transportation and defined in the travel wish, and that are also more specific than those compared in the general layer L1. Such travel criteria may include class, brand, number of connections, and type of transportation (e.g., air or train). Again, the query processing module 52 may determine an LSV for each retained transportation travel product based on these comparisons, and, to determine which retained transportation travel products should continue to be retained, may compare the LSV of each retained transportation travel product to a satisfaction threshold determined or specified for the transportation layer L2. In this example, Flight 1, Flight 2, and Train 1 continue to be retained after application of the transportation layer L2, and Train 2 is discarded.

At this point, the query processing module 52 may query the backend data sources 58 for additional backend data indicative of hotel travel products based on the transportation travel products remaining after application of the transportation layer L2, and possibly based on the one or more of the hotel-related travel criteria defined in the travel wish. More particularly, the query processing module 52 may limit the search to those backend data sources 58 that include pricing and availability data for hotel travel products, and narrow the search based on the details of the remaining transportation travel products, such as the date, departure time, arrival time, and arrival location associated with each remaining transportation travel product. In other words, for each remaining transportation travel product, the query processing module 52 may search the backend data sources 58 for hotel travel products that will work or be compatible with the transportation travel product, and that may be relevant to one or more hotel-specific travel criteria of the travel wish.

Because the number of remaining transportation travel products may be minimized so as to include only those that are most likely to be satisfactory relative to the travel criteria of the travel wish, the number of hotel travel products returned from the backend data sources 58 is likewise minimized to those that, at least when combined with the remaining transportation products, are most likely to interest the user. Consequently, the amount of data that is returned to the query processing module 52 from the backend data sources 58 is reduced, while the overall quality of the received data relative to satisfying the user is improved. As a result, the query processing module 52 may generate better travel solutions faster. In this example, the hotel travel products returned from the backend data sources 58 include Hotel 1, Hotel 2, Hotel 3, Hotel 4, and Hotel 5.

After the hotel travel products are received, the query processing module 52 may apply the destination layer L3 to the hotel travel products. In the destination layer L3, the hotel travel products may be compared to destination/hotel-specific travel criteria that are defined in the travel wish, such as location within an area, distance from an airport, rating, amenities, and events. As before, the query processing module 52 may then determine an LSV for each hotel travel product based on these comparisons, and may compare the LSV of each hotel travel product to a satisfaction threshold determined or specified for the destination layer L3. Those that are not greater than or equal to the satisfaction threshold may be discarded, and the others may be retained. In this example, Hotels 1, 2, and 4 are retained, and Hotels 3 and 5 are discarded.

After the hotel travel products are filtered to include only those that are most likely to satisfy the user, source data for the travel wish may be considered retrieved (block 110 of FIG. 4), and responses 62 (i.e., travel solutions) for the travel wish may be generated based on the retrieved source data (block 112, FIG. 4). Specifically, the query processing module 52 may combine the transportation travel products remaining in the filtered initial backend data with the hotel travel products remaining in the filtered additional backend data based on their compatibility. In other words, each transportation product may be paired with the hotel travel products that were returned based on the transportation travel product. In this case, Flight 1 is paired with Hotel 1 and Hotel 2, Flight 2 is paired with Hotel 1, and Train 1 is paired with Hotel 4. Each of these combinations may be stored as a travel solution for the travel wish, such as in the response database 56, and if determined notification eligible, may be included in a notification 64 sent to the user.

Hence, the iterative optimization algorithm enables the query processing module 52 to analyze data retrieved from the backend data sources 58 layer by layer, and filter out those products or results that are not promising relative to the user's defined search criteria. In this way, when additional backend data is retrieved from the backend data sources 58, the amount of data returned is limited based on the previously filtered data retrieved from the backend data sources 58. Consequently, the iterative optimization algorithm reduces the overall amount of data that is returned from the backend data sources 58 while increasing the quality of the data that is returned relative to a search query 60 submitted by a user, which enables the generation of better responses 62 faster.

As previously described, generating responses 62 from source data retrieved for a search query 60 may include calculating an RSV for each response 62. In some embodiments, the RSV for a given response 62 may be equal to the multiplication of the normalized or non-normalized LSV's calculated for each result on which the response 62 is based. For instance, with reference to the three-layer example above, the satisfaction value for each travel solution may be equal to the multiplication of each non-normalized LSV, namely:

$$RSV = \Sigma_{i=0}^{n} w_i f_i(x_i) * \Sigma_{j=0}^{m} w_j f_j(x_j) * \Sigma_{k=0}^{p} w_k f_k(x_k)$$

where n is equal to the number of search criteria compared in the general layer L1, m is equal to the number of search criteria compared in the transportation layer L2, and p is equal to the number of search criteria compared in the destination layer L3. Under this formula, results from the backend data sources 58 that are considered in later layers have a backwards impact on results considered in earlier layers relative to RSV. In this way, if a response 62 includes a combination of a really good result considered in an earlier layer relative to the search criteria with a result considered in a later layer that is not as good relative to the search criteria, the later-considered result will negatively impact the earlier-considered result with respect to the RSV of the response 62. Each RSV may be normalized so as to be in the interval of [0,100].

Figure 8:
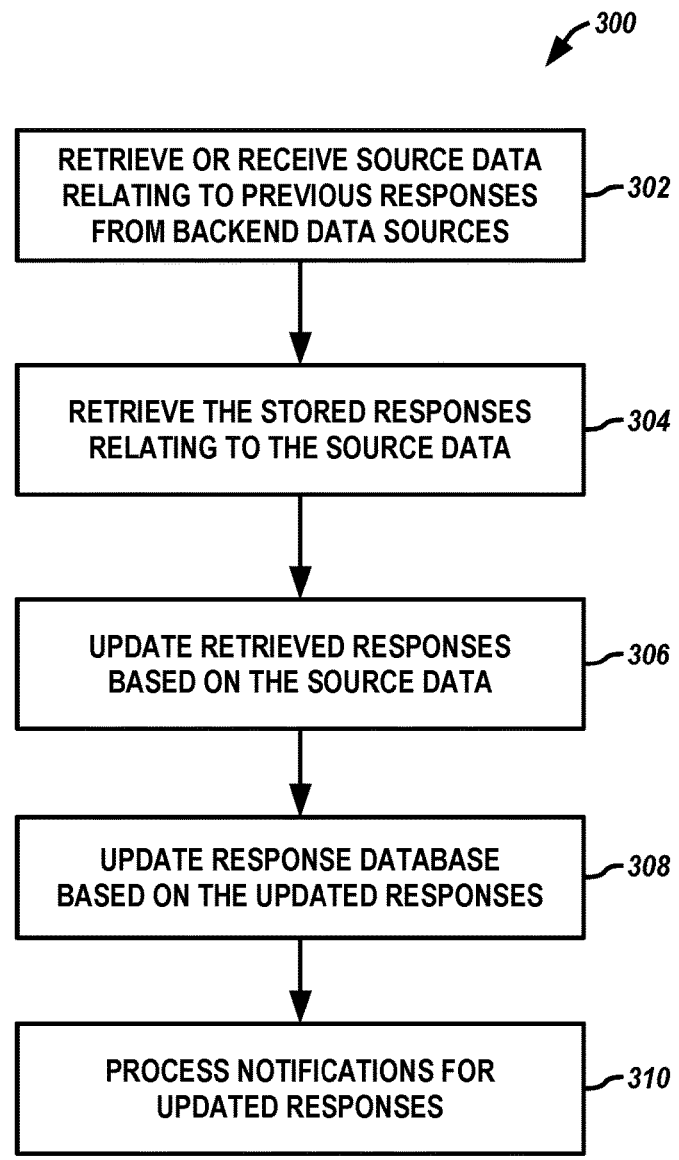
FIG. 8 is a flowchart of an exemplary process for refreshing responses previously generated and stored for a search query that may be performed by the processing architecture of FIG. 3.

FIG. 8 illustrates a process 300 for refreshing responses 62 previously generated and stored for a search query 60. The process 300 may be performed by the query processing module 52 of the processing architecture 50.

In block 302, source data relating to the previous responses 62 may be automatically retrieved or received from the backend data sources 58. With respect to automatically receiving data, whenever a change that relates to one or more of the previous responses 62 occurs in the backend data sources 58 (e.g., a change, such as a pricing change, to a result or product that was previously stored in the backend data sources 58 and that served as a basis for a previously generated response 62), the backend data sources 58, or a plug-in module associated therewith, may automatically activate a push mechanism to push data indicative of the change to the query processing module 52. For example, the data may be pushed from the specific backend data source 58 in which the change occurs. Alternatively, rather than pushing data for changes that specifically relate to one or more of the stored responses 62, each backend data source 58, or a plug-in module associated therewith, may automatically push data indicative of any change occurring therein, regardless of whether such change affects a previous response 62. Use of the plug-in module enables each backend data source 58 to be adapted with the capability to provide real-time notifications of data changes to the query processing module 52 without having to be completely reconfigured. Such real-time notifications of changes to products or results previously stored in the backend data sources 58 produces a strong consistency between the backend data sources 58 and the processing architecture 50, which enables the processing architecture 50 to notify the user of interesting responses 62 faster.

With respect to automatically retrieving data, the query processing module 52 may be configured to activate a pull mechanism to pull, or at least attempt to pull, at regular or irregular periods (e.g., twice a week), data from the backend data sources 58 that relates to the previous responses 62. More particularly, the query processing module 52 may query the backend data sources 58 for results and products on which the previously stored responses 62 were based. In this way, the query processing module 52 will retrieve any changes that have occurred in the backend data sources 58 that may affect the previous responses 62.

In block 304, the previous responses 62 relating to the received or retrieved source data may be retrieved, such as from the response database 56. When the data indicative of change is automatically pushed from the backend data sources 58, the query processing module 52 may retrieve the responses 62 as is illustrated in the process 200 (i.e., after and/or in response to the data being received). However, when data relating to the responses 62 is retrieved from the backend data sources 58 at regular or irregular periods, the query processing module 52 may retrieve the related responses 62 prior to querying the backend data sources 58. In this way, the query processing module 52 is aware of which data to retrieve, or at least attempt to retrieve, from the backend data sources 58 via the pull mechanism.

In block 306, one or more of the retrieved responses 62 may be updated based on the retrieved or received source data. In the received data case, block 306 may include recalculating the RSV for one or more of the retrieved responses 62 based on the received data. In the retrieved data case, block 306 may include matching the retrieved data with the retrieved responses 62, determining which of the retrieved responses 62 are no longer accurate based on the matching, and updating those responses 62 accordingly, which may likewise include recalculating the RSV for each response 62.

Block 306 may also include determining those retrieved responses 62 that are no longer available based on the received or retrieved source data. For example, the received or retrieved source data may indicate that a flight included in a previously generated travel solution is now full or cancelled. As another example, in the retrieved data case, if one of the responses 62 is unable to be fully matched with the retrieved data, such as because no data is returned from the backend data sources 58 for a result or product in the response 62, then the response 62 may no longer be available. These responses 62 may be updated by being flagged or otherwise indicated as no longer available.

In block 308, the response database 56 may be updated based on the updated responses 62. More particularly, each retrieved response 62 that changed or updated in block 306 be updated in the response database 56. Alternatively, changed or updated responses 62 may be added to the response database 56 along with their previous versions, which enables tracking the evolution of responses 62. Furthermore, those responses 62 determined no longer available may be deleted from the response database 56. Alternatively, an indication that the response 62 is no longer available and/or supported by data in the backend data sources 58 may be added to the response database 56.

In block 310, notifications 64 may be processed for each of the updated responses 62 that were changed or updated. More particularity, a determination may be made of whether each of the updated responses 62 is notification eligible. In response to determining that a changed or updated response 62 is notification eligible, the user may be notified of the updated response 62.

Figure 9:
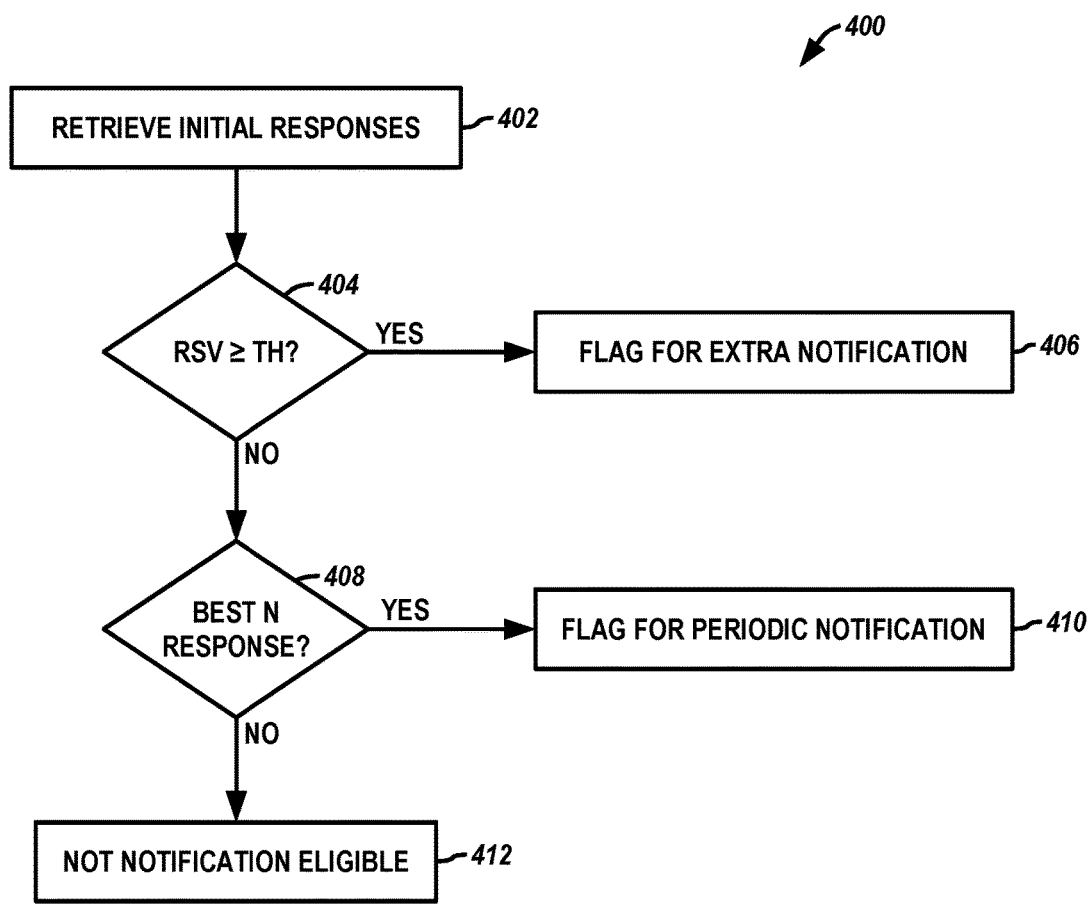
FIG. 9 is a flowchart of an exemplary process for determining whether responses generated for a new search query are notification eligible that may be performed by the processing architecture of FIG. 3.

FIG. 9 illustrates a process 400 for determining whether responses 62 generated for a new search query 60 are notification eligible. More particularly, the first time responses 62 are generated for a search query 60 (referred to hereinafter as "initial responses"), the process 400 may determine whether, for each initial response 62, the user should be notified of the initial response 62 immediately or soon thereafter, notified of the initial response 62 in a next periodic notification 64, or not notified. The process 400 may be implemented by the query processing module 52 of the processing architecture 50, and may occur after responses 62 are generated for a new search query 60 (e.g., in block 116 of FIG. 4).

In block 402, initial responses 62 that have been generated for a new search query 60 may be retrieved, such as from the response database 56. More particularly, the query processing module 52 may be configured, at regular or irregular intervals, to retrieve initial responses 62 that have been generated for a new search query 60, such as those responses 62 generated the first time blocks 108 through blocks 114 are performed for a search query 60 in FIG. 4. Alternatively, the query processing module 52 may begin processing notification eligibility for initial responses 62 generated for a new search query 60 immediately after the initial responses 62 are generated and/or stored.

Figure 12:
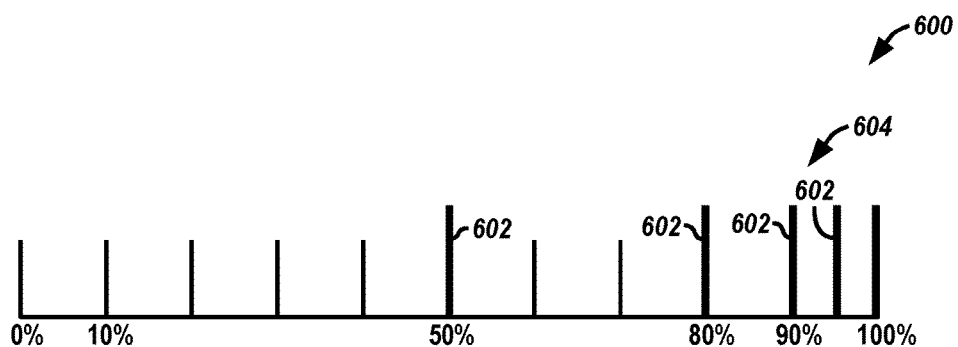
FIG. 12 is an illustration of an exemplary scale that may be utilized to determine whether a response is eligible for an extra notification or a periodic notification in the process of FIG. 10.

In block 404, for each initial response 62, a determination may be made of whether the RSV for the initial response 62 is greater than or equal to a determined or specified notification threshold. This threshold may be specified by the user when creating the search query 60, may be preprogrammed into the query processing module 52, such as by a system administrator or other user, or may be empirically determined based on the initial responses 62 themselves (e.g., the lower bound of an upper window 604 of a confidence scale 600, as shown in FIG. 12, may represent the notification threshold). In response to determining that the RSV for a retrieved initial response 62 is greater than or equal to the notification threshold ("Yes" branch of block 404), then in block 406, the initial response 62 may be flagged as eligible for an extra notification 64, which may indicate to the query processing module 52 that the user should be immediately notified of the initial response 62, or notified of the initial response 62 prior to the next periodic notification 64, if possible. However, in response to determining that the RSV for the initial response 62 is less than the determined or specifie notification threshold ("No" branch of block 404), then in block 408, another determination may be made of whether the initial response 62 is one of the best initial responses 62 generated for the new search query 60.

More particularly, for each initial response 62 generated for a new search query 60, the query processing module 52 may be configured to determine whether the response 62 is within a subset of the initial responses 62, where the RSV for each initial response 62 in the subset is greater than the RSV for each initial response 62 not in the subset. In other words, the query processing module 52 may determine the N best initial responses 62 according to the RSV calculated for each initial response 62, where N may be selected by the user when creating the search query 60, or determined empirically by the query processing module 52. In response to determining that an initial response 62 is one of the N best initial responses 62 ("Yes" branch of block 408), then in block 410, the initial response 62 may be flagged as eligible for a next periodic notification 64 being sent to the user. Alternatively, in response to determining that an initial response 62 is not one of the best N initial responses 62 ("No" branch of block 408), then in block 412, a determination may be made that the initial response 62 is not notification eligible.

In general, the purpose of periodic notifications 64 is to notify the user of recently found or refreshed responses 62 for a given search query 60 that are likely to be interesting to the user. To this end, the user may enter, via the GUI 61, a frequency as part of a search query 60, such as twice a month or once a month, in which he or she wishes to receive periodic notifications 64. The GUI 61 may also enable a user to change these settings, or other settings, after the search query's 60 creation. The number of responses 62 per periodic notification 64, or any other notification 64 generated by the query processing module 52, may be limited, such as by a system administrator or by the user via the GUI 61. Accordingly, if, when a periodic notification 64 is being generated, there are more responses 62 flagged for periodic notification 64 than the limit, only the best ones (based on the RSV) may be included in the periodic notification 64. For those that are not included, the periodic notification 64 may include a notice that additional interesting responses 62 for the search query 60 may be viewed via the GUI 61. In some embodiments, only VIP users may be granted functionality to view such additional interesting responses 62 via the GUI 61.

Figure 10:
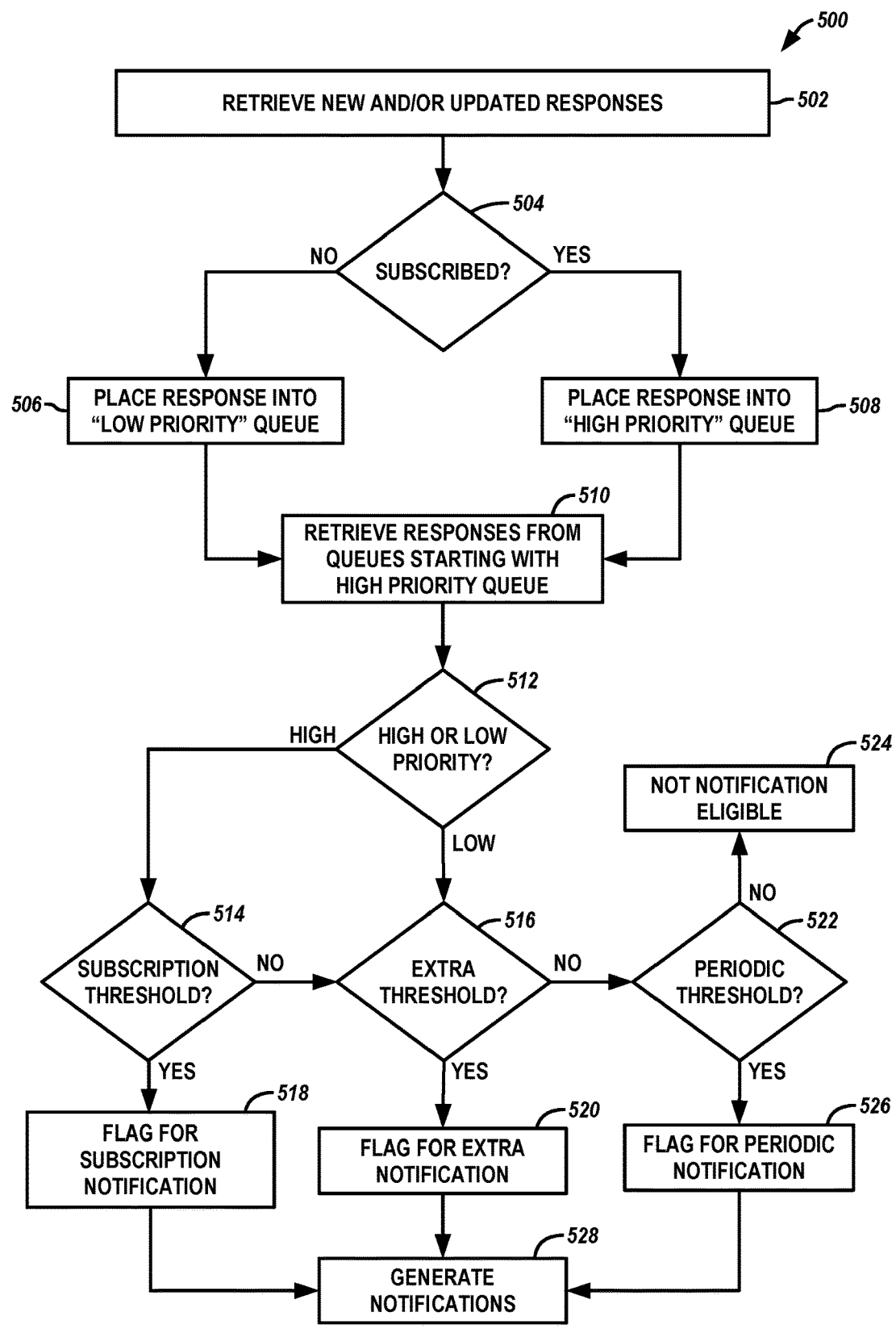
FIG. 10 is a flowchart of an exemplary process for determining whether updated responses or new responses generated for already processed search queries are notification eligible that may be performed by the processing architecture of FIG. 3.

FIG. 10 illustrates a process 500 for determining whether updated responses 62 or new responses 62 generated for an already processed search query 60, meaning responses 62 generated in a subsequent performance of one or more of blocks 110 through 114 of the process 100, are notification eligible. The process 500 may be performed by the query processing module 52 of the processing architecture 50, and may occur in block 116 of the process 100 and block 310 of the process 300.

In block 502, each new or updated responses 62 may be retrieved, such as from the response database 56. More particularly, the query processing module 52, at regular or irregular periods, may query the response database 56 for new or updated responses 62 that have been generated for already processed search queries 60. In block 504, for each retrieved response 62, a determination may be made whether the response 62 includes a subscription. Alternatively, as soon as a new or updated response 62 is generated, the query processing module 52 may be configured to make this determination. In either case, in response to a determination that the response 62 does not include a subscription ("No" branch of block 504), then in block 506, the response 62 may be added to a "low priority" queue. In response to a determination that the response 62 does include a subscription ("Yes" branch of block 504), then in block 508, the response 62 may be added to a "high priority" queue. Consequently, all of the responses 62 stored in the high priority queue may include subscriptions, and none of the responses 62 stored in the low priority queue may include subscriptions.

After the responses 62 are placed in the queues, in block 510, the responses 62 may be retrieved from the queues, starting with those in the high priority queue. More particularly, the query processing module 52 may be configured, such as at regular or irregular intervals, to retrieve and determine notification eligibility of each response 62 stored in the high priority queue, and once the high priority queue is empty, thereafter retrieve and determine notification eligibility for each response 62 stored in the low priority queue. In this way, the responses 62 having been subscribed to by the user are processed for notification eligibility before any other new or updated response 62.

For each response 62 retrieved from the queues, in block 512, a determination may be made of whether the response 62 comes from the high priority queue or the low priority queue. If the response 62 comes from the high priority queue ("High" branch of block 512), then the response 62 includes a subscription. Accordingly, in block 514, a determination may be made of whether the response 62 satisfies a subscription notification threshold. Alternatively, if a response 62 comes from the low priority queue ("Low" branch of block 512), then the user has not subscribed to the response 62. In this case, in block 516, a determination may be made of whether the response 62 satisfies an extra notification threshold.

In some embodiments, the subscription threshold may include an interval associated with a particular criterion, such as price, that is calculated for each subscribed response 62 before the response 62 is updated. More particularly, each subscribed response 62 may be associated with a price and a calculated price interval. If, upon being updated, the price associated with a subscribed response 62 passes the upper bound or the lower bound of the price interval associated with the response 62, then the updated response 62 may be determined to satisfy the subscription notification threshold ("Yes" branch of block 514), and in response, in block 518, the response 62 may be flagged as eligible for a subscription notification 64, which may indicate that the user should be notified of the response 62 immediately, or at least before the next periodic notification 64, if possible. Alternatively, if the price associated with the subscribed response 62 does not pass the upper bound or the lower bound of the price interval associated with the response 62 upon being updated, then the updated response 62 may be determined not to satisfy the subscription threshold ("No" branch of block 514), and a determination may thereafter be made in block 516 of whether the response 62 from the high priority queue satisfies the extra notification threshold.

The price interval calculated for each subscribed response 62 may be based on a current price associated with the response 62 after the response 62 is subscribed to but before the response 62 is updated. More particularly, when a user subscribes to a response 62, the price interval may be calculated based on the current price that is then associated with response 62. Specifically, the price interval may be calculated using the following formula:

$$[\text{current price} - y\% * \text{current price}; \text{current price} + y\% * \text{current price}]$$

where y % is a proportion of the current price. In some embodiments, y % may be determined by the following formula:

$$y\% = \frac{b * \sqrt{a}}{\sqrt{x}}$$

where x is the current price associated with the subscribed response 62, and b is a width value (i.e., a y %) for a particular price a. This formula is therefore configurable with one single point of a and b, which may be based on the search criteria of the search query 60. After the price interval has been calculated, if the response 62 is updated, a determination may be made of whether the update causes the price associated with the response 62 to pass outside of the previously calculated price interval. If so, then the response 62 may be flagged for a subscription notification 64.

Figure 11:
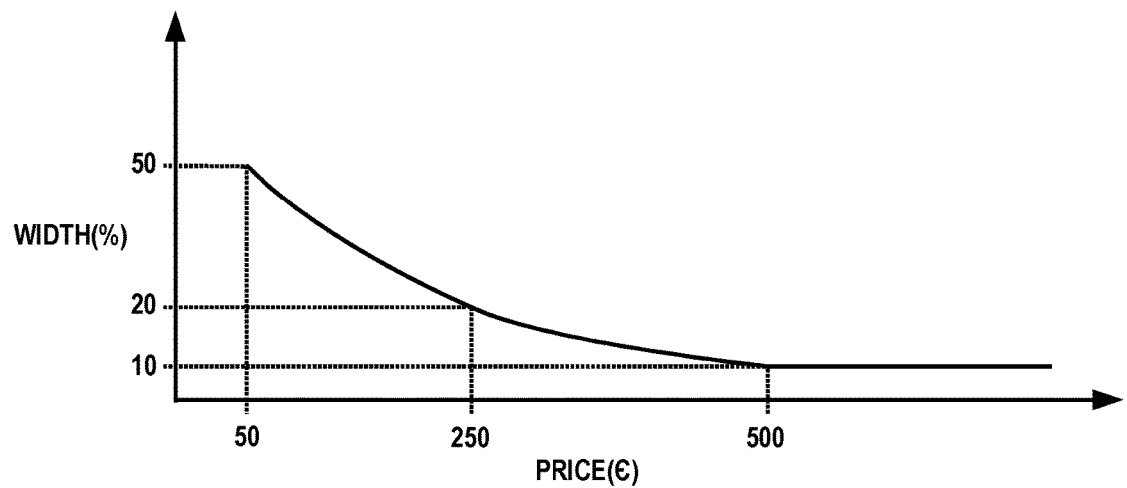
FIG. 11 is a graph of an exemplary function that may be utilized to determine a subscription threshold for the process of FIG. 10.

FIG. 11 illustrates a curve that may represent the value of y % as the currently price associated with a subscribed response 62 changes. In the illustrated embodiment, when the current price associated with a subscribed response 62 is two hundred and fifty euros, the value of y % is 20%. Accordingly, for an updated version of the response 62 to satisfy the subscription threshold, the price of the response 62 will have to either pass three hundred euros or go below two hundred euros, which are the respective upper and lower bounds of the price interval. Alternatively, if the current price associated with a subscribed response 62 is five hundred euros, then the value of y % is 10%. Accordingly, less of change to the price associated with the subscribed response 62 is necessary for the response 62 to satisfy the subscription threshold. The price interval for a response 62 may only be rebuilt, such as using the above formulas, if the upper or lower bound of the response's 62 price interval is passed. If so, then a new price interval may be calculated for the response 62 that is based on the current price associated with the updated version of the response 62.

Referring again to FIG. 10, in response to determining that a response 62 comes from the low priority queue, or in response to determining that a subscribed response 62 does not satisfy a subscription notification threshold, then in block 516, a determination may be made of weather the response 62 satisfies an extra notification threshold. The purpose of the extra notification 64 may be to immediately notify the user of responses 62 that are like to be very interesting to the user (e.g., responses 62 for which the RSV is very high or significantly better than other responses 62), or at least notify the user of such responses 62 before a next periodic notification 64.

In some embodiments, whether a response 62 satisfies an extra notification threshold may be based on a confidence scale generated for the search query 60 for which the response 62 is generated. In particular, after an initial set of responses 62 is generated for a search query 60, or after notification eligibility is processed for new or updated responses 62 generated for an already processed search query 60, the query processing module 52 may be configured to generate a confidence scale for the search query 60 based on the current responses 62 for the search query 60. The confidence scale may range from 0% to 100%, and each initial response 62 may be compared to the confidence scale according to its RSV.

FIG. 12 illustrates a confidence scale 600 generated for a search query 60. The confidence scale 600 may include several thresholds 602, each being associated with a different RSV. In general, the query processing module 52 may utilize the thresholds 602 to determine whether a user should be notified of a response 62 in an extra notification 64 and/or a periodic notification 64. The number and placement of the thresholds 602 on the confidence scale 600 may be based on the strategy used to calculate the RSV of each response 62, and may take into account the density and repartition of the RSV's of the responses 62 generated for the search query 60, and the change to a response 62 that is desired to be required before the user should be notified of the response 62. As shown in the illustrated embodiment, the frequency of the thresholds 602 on the confidence scale 600 increases as RSV increases. Consequently, the distance between two consecutive thresholds 602 in higher portions of the confidence scale 600 may be smaller than the distance between two consecutive thresholds 602 in lower portions of the confidence scale 600, which functions to increase notifications 64 of more interesting responses 62 relative to less interesting responses 62 (i.e., those responses 62 with lower RSV's).

The confidence scale 600 may further include an upper window 604 that is an interval starting from a certain threshold 602 on the confidence scale 600 to the maximum value on the confidence scale 600 (e.g., 100%). When the RSV calculated for a response 62 is in the upper window 604, the response 62 may be considered very interesting to the user. Accordingly, if the RSV for a previously generated response 62 passes into the upper window 604 upon being updated, or if the RSV for a newly generated response 62 is located in the upper window 604, then the query processing module 52 may be configured to determine that the response 62 satisfies an extra notification threshold ("Yes" branch of block 516 in FIG. 9), and in response, flag the response 62 as eligible for an extra notification 64 (block 520 of FIG. 9). Alternatively, if the RSV for a previously generated response 62 does not pass into the upper window 604 upon being updated, or the RSV for a newly generated response 62 is not located within the upper window 604, the query processing module 52 may be configured to determine that the response 62 fails to satisfy an extra notification threshold ("No" branch of block 516 in FIG. 9).

The confidence scale 600, and more particularly the upper window 604, may be defined per search query 60, and may be dynamic such that the lower bound of the upper window 604 is re-calculated after new or updated responses 62 are generated and/or processed for notification eligibility. Specifically, the upper window 604 may be calculated based on the RSV's of the most-recently generated and/or current responses 62, and not historical responses 62, as the purpose of the upper window 604 is to highlight very good responses 62 in the current context. In general, the confidence scale 600 should be compatible with the context of the current responses 62 for the search query 60 to reveal those "rare" responses 62 that are most likely to be interesting for the user. For example, a search query 60 having responses 62 for which the RSV's are typically around 60% may have an upper window 604 starting from around 80%. In this way, if periodically a response 62 is generated that has an RSV of over 80%, the response 62 may be considered very interesting to the user, who may then be notified of the response 62 in an extra notification 64. If better responses 62 begin to be generated regularly such that the average RSV of the current responses 62 rises to around 70%, then the lower bound of the upper window 604 may be recalculated and move up to 90%.

When calculating the lower bound of the upper window 604 for a search query 60, the average and the standard deviation of the RSV's of the current responses 62 for the search query 60 may be taken into account. The current responses 62 for a search query 60 may be considered as including any response 62 generated and stored for the search query 60 that is currently believed to accurately reflect the data in the backend data sources 58. For example, previous versions of updated responses 62 and responses 62 that are indicated as no longer available may be excluded from the meaning of current responses 62. In some embodiments, the lower bound of the upper window 604 may be calculated for a search query 60 using the following formula relative to the current responses 62 of the search query 60:

$$\text{Lower Bound} = \text{Coef} * \text{Avg RSV} + \sigma$$

where Avg RSV is the average of the RSV's of the current responses 62, and $\sigma$ is the standard deviation of the RSV's of the current responses 62. In general, Coef may be a variable value that is based on the Avg RSV of the current responses 62 and other universal constraints preprogrammed into the query processing module 52, such as by a system administrator or other user. In particular, Coef may be a function of universal constraints applicable to any and/or all responses 62, and of the Avg RSV of the current responses 62. Basing Coef off of such universal constraints and the Avg RSV of the current responses 62 may enable an administrator or other user to manipulate the upper window 604 for each and/or every set of current responses 62 based on the administrator's or user's preferences (i.e., the universal constraints). For example, in some embodiments, the value of Coef may be calculated via the following formula:

$$Coef = \frac{y2 - y1}{avg2 - avg1} * avg\ RSV + y1 - \frac{y2 - y1}{avg2 - avg1} * avg1$$

where y1 is a given Coef that would be desired, such as by a system administrator or other user, for a given Avg RSV (which is the value of avg1), and y2 is a given Coef that would be desired, such as by a system administrator or other user, for a given Avg RSV (which is the value of avg2). For example, assuming $\sigma$ is zero, (avg1, y1) may be set to (60%, 1.33), meaning that when the Avg RSV is 60%, it is desired for Coef to be 1.33. However, this value of Coef would not work for an Avg RSV of 90%, as assuming $\sigma$ is zero, 0.9×1.33 would result in a lower bound of 1.20 or 120%, which is too large and doesn't make sense as a lower bound. Accordingly, (avg2, y2) may be set to (90%, 1.06), meaning that when the Avg RSV is 90%, it is desired for Coef to be 1.06.

Referring again to FIG. 10, in response to determining that the response 62 fails to satisfy an extra notification threshold ("No" branch of block 516), then in block 522, a determination may be made of whether the response 62 satisfies a periodic notification threshold. Again, the query processing module 52 may be configured to make this determination based on a confidence scale 600 generated for the search query 60 for which the response 62 relates. Specifically, if a response 62, upon being updated, passes a threshold 602 on the confidence scale 600, then the query processing module 52 may be configured to determine that the response 62 satisfies a periodic notification threshold. If not, then the query processing module 52 may be configured to determine that the response 62 fails to satisfy a periodic notification threshold.

In block 522, if a determination is made that the response 62 fails to satisfy a periodic notification threshold ("No" branch of block 522), then in response, in block 524, a determination may be made that the response 62 is not notification eligible. Alternatively, if a determination is made that the response 62 does satisfy a periodic notification threshold ("Yes" branch of block 522), then in response, in block 526, the response 62 may be flagged as eligible for a periodic notification 64.

In block 528, notifications 64 may be generated for the responses 62 that are flagged for subscription notifications 64, extra notifications 64, and/or periodic notifications 64, and may be transmitted to the user. The timing in which block 528 is performed may depend on the type of notification 64. For example, after a response 62 is flagged for a subscription notification 64 or an extra notification 64, block 528 may be performed immediately for the flagged response 62 so as to notify the user of the response 62 as soon as possible. Alternatively, block 528 may be performed for those responses 62 flagged for a subscription notification 64 or an extra notification 64 after a portion of the responses 62 retrieved in block 502 have been processed for notification eligibility, or after all of the responses 62 retrieved in block 502 have been processed for notification eligibility.

In other embodiments, block 528 may be performed at a time interval after a first response 62 is flagged for a subscription notification 64 or an extra notification 64. More particularly, once a set amount of time has passed after a first response 62 is flagged for a subscription or extra notification 64, the query processing module 52 may generate one notification 64 for all responses 62 that have so far been flagged for a subscription or extra notification 64 and not yet notified of, subject to any limits on the number of responses 62 which may be included in a given notification 64 and the number of notifications 64 that a user wishes to receive, which may be configurable by the user via the GUI 61.

For example, rather than sending out a notification 64 for each response 62 that is flagged for a subscription notification 64, the responses 62 flagged for subscription notifications 64 may be grouped together using a time window. More particularly, when a response 62 for a search query 60 is flagged for a subscription notification 64, the query processing module 52 may check to determine whether a time window already exists for the search query 60. If not, then the query processing module 52 may create a new time window for the search query 60. At the end of the time window, the query processing module 52 may generate and transmit a single notification 64 to the user including each response 62 that was flagged for a subscription notification 64 during the time window. The same procedure may be utilized for those responses 62 flagged for extra notifications 64. Alternatively, at the end of the time window, the query processing module 52 may generate and transmit a single notification 64 to the user that includes each response 62 that has been flagged for a subscription notification 64 or an extra notification 64 during the time window. In this way, the number of notifications 64 generated and sent to the user is further reduced.

Extra notifications 64 and subscription notifications 64 may be in addition to periodic notifications 64, which are notifications 64 generated and transmitted to the user on a periodic basis, possibly in accordance with settings provided by the user via the GUI 61. When it is time to send out a periodic notification 64 for a search query 60, the query processing module 52 may be configured to automatically generate a notification 64 that includes each response 62 of a search query 60 that is flagged for a notification 64, whether it be a subscription notification 64, an extra notification 64, or a periodic notification 64, subject to limits on the number of responses 62 that may be included in a notification 64. As soon as flagged response 62 is included in any notification 64 sent to the user, the flag is removed. In this way, if a response 62 flagged for a subscription notification 64 or an extra notification 64 is included in a regularly scheduled periodic notification 64, the response 62 will not be sent again in a subscription notification 64 or an extra notification 64, which avoids redundancies and thereby further reduces the number of notifications 64 generated by the query processing module 52. By reducing the number of notifications 64 that are generated by the query processing module 52, the drain on system resources is further reduced.

The user may choose to activate or deactivate extra notifications 64 and subscription notifications 64 for a search query 60 via the GUI 61. The user may also restrict the number of extra notifications 64 and subscription notifications 64 per time period. For example, the user may set the search query 60 such that only one extra notification 64 and/or subscription notification 64 may be sent per week, two extra notifications 64 and/or subscription notifications 64 may be sent per week, or an unlimited number of extra notifications 64 and/or subscription notifications 64 may be sent per week.

The processing architecture 50 may include additional features other than those that have been described above. In one embodiment, the processing architecture 50 may include a price prediction feature. More particularly, the query processing module 52 may be configured to compute a prediction with a percentage of confidence of the price associated with a response 62 or a travel product by using historical data, such as the responses 62 stored in the response database 56. In this way, the query processing module 52 may predict price variation for a future response 62.

In addition, the processing architecture 50 may be associated with a profile system that includes profiles for multiple users. Over time, such as when a user submits search queries 60 for processing, the processing architecture 50 may be configured to update the user's profile based on the search queries 60 submitted by the user. Specifically, the processing architecture 50 may be configured to track the search queries 60 submitted by a user, and further track which responses 62 generated for the search query 60, such as travel solutions, are utilized or booked by the user, and thereby determine preferences for the user by measuring the relationship between the user's search queries 60 and the responses 62 that the user uses or books. Furthermore, rather than a user manually assigning weights to each search criterion of a submitted search query 60 via the GUI 61, the query processing module 52 may utilize historical data and the user's continuously updated profile to automatically calculate such weights. The query processing module 52 may also utilize the historical data and the user's updated profile to tailor the fuzzy functions applied in the iterative optimization algorithm, and to add inferred information or values to the LSV's described above.

Furthermore, the processing architecture 50 may be associated with a recommendation system that enables the processing architecture 50 to infer a user's preferences based on the user's defined search criteria in a search query 60 and/or the user's profile, and that enables the processing architecture 50 to provide suggestions for a search query 60 or to provide better responses 62 based on the user's preferences. For example, if a user creates a travel wish that indicates a desire to visit Paris for one weekend within a four-month period, the processing architecture 50 may suggest a dedicated weekend based on events occurring at the destination (e.g., concert, football match, tour operator discounts) and the user's preferences. The processing architecture 50 may further be integrated with loyalty programs, and may be able to provide suggestions for a user's search query 60 or tailor responses 62 for a search query 60 based on the user's profile at one or more of the loyalty programs (e.g., suggest certain travel solutions based on the number of miles available in the user's accounts).

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A method for processing a search query, the method comprising:
   receiving, at one or more computer processors, the search query comprising search criteria;
   storing, by the one or more computer processors, the search query in one or more persistent storage devices; and
   periodically and automatically performing, by the one or more computer processors, the following operations:
      retrieving the search query from the one or more persistent storage devices,
      retrieving, using an iterative optimization algorithm, first source data that relates to the search query from one or more backend data sources,
      generating a plurality of responses for the search query based on the first source data,
      calculating a satisfaction value for each response based on the search criteria,
      determining whether the satisfaction value for a respective response is greater than or less than a notification threshold,
      in response to determining that the satisfaction value for the respective response is less than the notification threshold:
         determining whether the respective response is within a subset of the plurality of responses, wherein the satisfaction value for each response in the subset is greater than the satisfaction value for each response that is not in the subset,
         in response to determining that the respective response is within the subset, flagging the respective response as eligible for a periodic notification, and
         in response to determining that the respective response is not within the subset, determining that the respective response is not notification eligible,
      determining whether each of the plurality of responses is notification eligible based on the determination of whether the satisfaction value for the respective response is greater than the notification threshold; and
      notifying a user of each response determined notification eligible.

2. The method of claim 1, wherein the search query further comprises a termination point, and the operations are performed periodically and automatically until the termination point is reached.

3. The method of claim 1, wherein the one or more backend data sources comprise a plurality of backend data sources, and the retrieving the first source data from the one or more backend data sources using the iterative optimization algorithm comprises:
   retrieving first backend data from a first one of the plurality of backend data sources based on a first one of the search criteria;
   filtering the first backend data based on a first satisfaction threshold and a first portion of the search criteria that is relevant to the first backend data;
   retrieving second backend data from a second one of the plurality of backend data sources based on a second one of the search criteria and the filtered first backend data; and
   filtering the second backend data based on a second satisfaction threshold and a second portion of the search criteria that is relevant to the second backend data, wherein the first source data is based on the filtered first backend data and the filtered second backend data.

4. The method of claim 3, wherein the first backend data comprises a plurality of first results, and the filtering the first backend data based on the first satisfaction threshold and the first portion of the search criteria that is relevant to the first backend data comprises:
   applying one or more first fuzzy functions that are derived from the first portion of the search criteria to each of the first results to calculate a first satisfaction value for each first result;
   comparing the first satisfaction value for each first result with the first satisfaction threshold; and
   filtering the first results by determining, as a plurality of second results, each first result for which the first satisfaction value is greater than the first satisfaction threshold.

5. The method of claim 4, wherein the filtering the first backend data further comprises:
   applying one or more second fuzzy functions that are derived from a third portion of the search criteria that is relevant to the first backend data to each of the second results to calculate a second satisfaction value for each second result;
   comparing the second satisfaction value for each second result with a third satisfaction threshold; and
   filtering the second results by determining, as a plurality of third results, each second result for which the second satisfaction value is greater than the third satisfaction threshold, wherein the filtered first backend data comprises the third results.

6. The method of claim 4, wherein each of the search criteria of the search query is associated with a weight, each of the one or more first fuzzy functions is associated with the first portion of the search criteria, and the applying the one or more first fuzzy functions to each first result to calculate the first satisfaction value for each first result comprises:
   multiplying an output of each first fuzzy function with the weight associated with a search criterion that is associated with the respective first fuzzy function.

7. The method of claim 3, wherein the second backend data comprises a plurality of results, and the filtering the second backend data based on the second satisfaction threshold and the second portion of the search criteria that is relevant to the second backend data comprises:
   applying one or more fuzzy functions that are derived from the second portion of the search criteria to each of the results to calculate a satisfaction value for each result;
   comparing the satisfaction value for each result with the second satisfaction threshold; and
   determining each result for which the satisfaction value is greater than the second satisfaction threshold, wherein the filtered second backend data comprises each determined result.

8. The method of claim 1, further comprising:
   storing the plurality of responses in the one or more persistent storage devices;
   after the plurality of responses are stored, automatically receiving, via a push mechanism, or retrieving, via a pull mechanism, second source data from the one or more backend data sources that relate to at least one of the plurality of responses;
   retrieving the at least one of the plurality of responses from the one or more persistent storage devices;

updating one or more of the retrieved at least one of the plurality of responses based on the second source data;

determining whether each of the one or more updated responses is notification eligible; and notifying the user of each updated response determined notification eligible.

9. The method of claim 8, wherein the determining whether each of the one or more updated responses is notification eligible comprises:

for each updated response:
  determining whether the respective updated response includes a subscription,
  in response to determining that the respective updated response includes the subscription, adding the respective updated response to a high priority queue, and
  in response to determining that the respective updated response does not include the subscription, adding the respective updated response to a low priority queue;

determining whether each updated response in the high priority queue is notification eligible; and after determining whether each updated response in the high priority queue is notification eligible, determining whether each updated response in the low priority queue is notification eligible.

10. The method of claim 9, wherein the determining whether each updated response in the high priority queue is notification eligible comprises, for each updated response in the high priority queue:

determining whether the respective updated response satisfies a subscription notification threshold for the respective updated response;

in response to determining that the respective updated response satisfies the subscription notification threshold for the respective updated response, flagging the respective updated response as eligible for a subscription notification; and in response to determining that the respective updated response fails to satisfy the subscription notification threshold for the respective updated response:
  determining whether the respective updated response satisfies an extra notification threshold for the search query, and
  in response to determining that the respective updated response satisfies the extra notification threshold for the search query, flagging the respective updated response as eligible for an extra notification.

11. The method of claim 9, wherein the determining whether each updated response in the low priority queue is notification eligible comprises, for each updated response in the low priority queue:

determining whether the respective updated response satisfies an extra notification threshold for the search query; and in response to determining that the respective updated response satisfies the extra notification threshold for the search query, flagging the respective updated response as eligible for an extra notification.

12. A system for processing a search query, the system comprising:

one or more computer processors; and a memory storing instructions that upon execution by the one or more computer processors cause the system to:
  in response to receiving the search query comprising search criteria:
    store the search query in one or more persistent storage devices; and
    periodically and automatically perform the following operations:
      retrieve the search query from the one or more persistent storage devices,
      retrieve, using an iterative optimization algorithm, first source data that relates to the search query from one or more backend data sources,
      generate a plurality of responses for the search query based on the first source data,
      calculate a satisfaction value for each response based on the search criteria,
      determine whether the satisfaction value for the respective response is greater than or less than a notification threshold,
      in response to determining that the satisfaction value for the respective response is less than the notification threshold:
        determine whether the respective response is within a subset of the plurality of responses, wherein the satisfaction value for each response in the subset is greater than the satisfaction value for each response that is not in the subset,
        in response to determining that the respective response is within the subset, flag the respective response as eligible for a periodic notification, and
        in response to determining that the respective response is not within the subset, determine that the respective response is not notification eligible;
      determine whether each of the plurality of responses is notification eligible based on the determination of whether the satisfaction value for the respective response is greater than the notification threshold; and
      notify a user of each response determined notification eligible.

13. The system of claim 12, wherein the one or more backend data sources comprise a plurality of backend data sources, and the instructions upon execution cause the system to retrieve the first source data from the one or more backend data sources using the iterative optimization algorithm by causing the system to:

retrieve first backend data from a first one of the plurality of backend data sources based on a first one of the search criteria;

filter the first backend data based on a first satisfaction threshold and a first portion of the search criteria that is relevant to the first backend data;

retrieve second backend data from a second one of the plurality of backend data sources based on a second one of the search criteria and the filtered first backend data; and filter the second backend data based on a second satisfaction threshold and a second portion of the search criteria that is relevant to the second backend data, wherein the first source data is based on the filtered first backend data and the filtered second backend data.

14. The system of claim 13, wherein the first backend data comprises a plurality of results, and the instructions upon execution cause the system to filter the first backend data based on the first satisfaction threshold and the first portion of the search criteria that is relevant to the first backend data by causing the system to:

apply one or more fuzzy functions that are derived from the first portion of the search criteria to each of the results to calculate a satisfaction value for each result;

compare the satisfaction value for each result with the first satisfaction threshold; and filter the results by determining each result for which the satisfaction value is greater than the first satisfaction threshold.

15. The system of claim 14, wherein each of the search criteria of the search query is associated with a weight, each of the one or more fuzzy functions is associated with the first portion of the search criteria, and the instructions upon execution cause the system to apply the one or more fuzzy functions to each result to calculate the satisfaction value for each result by causing the system to:

multiply an output of each fuzzy function with the weight associated with a search criterion that is associated with the respective fuzzy function.

16. The system of claim 12, wherein the instructions upon execution further cause the system to:

store the plurality of responses in the one or more persistent storage devices; and in response to automatically receiving, via a push mechanism, or retrieving, via a pull mechanism, second source data from the one or more backend data sources that relate to at least one of the plurality of responses after plurality of the responses are stored:

retrieve the at least one of the plurality of responses from the one or more persistent storage devices, update one or more of the retrieved at least one of the plurality of responses based on the second source data, determine whether each of the one or more updated responses is notification eligible, and notify the user of each updated response determined notification eligible.

17. The system of claim 16, wherein the instructions upon execution cause the system to determine whether each of the one or more updated responses is notification eligible by causing the system to:

for each updated response:

determine whether the respective updated response includes a subscription, in response to determining that the respective updated response includes the subscription, add the respective updated response to a high priority queue, and in response to determining that the respective updated response does not include the subscription, add the respective updated response to a low priority queue;

determine whether each updated response in the high priority queue is notification eligible; and after determining whether each updated response in the high priority queue is notification eligible, determine whether each updated response in the low priority queue is notification eligible.

18. The system of claim 17, wherein the instructions upon execution cause the system to determine whether each updated response in the high priority queue is notification eligible by causing the system to, for each updated response in the high priority queue:

determine whether the respective updated response satisfies a subscription notification threshold for the respective updated response;

in response to determining that the respective updated response satisfies the subscription notification threshold for the respective updated response, flag the respective updated response as eligible for a subscription notification; and in response to determining that the respective updated response fails to satisfy the subscription notification threshold for the respective updated response:

determine whether the respective updated response satisfies an extra notification threshold for the search query, in response to determining that the respective updated response satisfies the extra notification threshold for the search query, flag the respective updated response as eligible for an extra notification, and wherein the instructions upon execution cause the system to determine whether each updated response in the low priority queue is notification eligible by causing the system to, for each updated response in the low priority queue:

determine whether the respective updated response satisfies the extra notification threshold for the search query;

in response to determining that the respective updated response satisfies the extra notification threshold for the search query, flag the respective updated response as eligible for the extra notification.

19. A computer program product comprising:

a non-transitory computer-readable medium; and instructions stored on the non-transitory computer-readable medium that upon execution by one or more computer processors cause the one or more computer processors to:

in response to receiving the search query comprising search criteria:

store the search query in one or more persistent storage devices; and periodically and automatically perform the following operations:

retrieve the search query from the one or more persistent storage devices, retrieve, using an iterative optimization algorithm, first source data that relates to the search query from one or more backend data sources, generate a plurality of responses for the search query based on the first source data, calculate a satisfaction value for each response based on the search criteria, determine whether the satisfaction value for the respective response is greater than or less than a notification threshold, in response to determining that the satisfaction value for the respective response is less than the notification threshold:

determine whether the respective response is within a subset of the plurality of responses, wherein the satisfaction value for each response in the subset is greater than the satisfaction value for each response that is not in the subset, in response to determining that the respective response is within the subset, flag the respective response as eligible for a periodic notification, and in response to determining that the respective response is not within the subset, determine that the respective response is not notification eligible;

determine whether each of the plurality of responses is notification eligible based on the determination of whether the satisfaction value for the respective response is greater than the notification threshold; and notify a user of each response determined notification eligible.

\* \* \* \* \*